US008666791B1

(12) United States Patent
Fedele

(10) Patent No.: US 8,666,791 B1
(45) Date of Patent: Mar. 4, 2014

(54) METHOD AND APPARATUS FOR PROCUREMENT AGGREGATION

(76) Inventor: Joseph Fedele, New Hyde Park, NY (US)

( * ) Notice: Subject to any disclaimer, the term of this patent is extended or adjusted under 35 U.S.C. 154(b) by 0 days.

(21) Appl. No.: 13/372,324

(22) Filed: Feb. 13, 2012

(51) Int. Cl.
*G06Q 40/00* (2012.01)
(52) U.S. Cl.
USPC ......................................... 705/7.11; 705/7.42
(58) Field of Classification Search
USPC ............................................... 705/7.11, 7.42
See application file for complete search history.

(56) References Cited

U.S. PATENT DOCUMENTS

| | | | | |
|---|---|---|---|---|
| 5,299,115 | A | * | 3/1994 | Fields et al. .................. 705/7.22 |
| 5,459,656 | A | * | 10/1995 | Fields et al. .................. 705/7.22 |
| 6,260,024 | B1 | | 7/2001 | Shkedy |
| 6,604,089 | B1 | | 8/2003 | Van Horn et al. |
| 6,631,356 | B1 | * | 10/2003 | Van Horn et al. ............ 705/26.2 |
| 6,934,690 | B1 | | 8/2005 | Van Horn et al. |
| 6,980,962 | B1 | | 12/2005 | Arganbright et al. |
| 7,099,836 | B2 | | 8/2006 | Cichanowicz |
| 7,146,330 | B1 | | 12/2006 | Alon et al. |
| 7,181,419 | B1 | * | 2/2007 | Mesaros ....................... 705/26.2 |
| 7,194,427 | B1 | | 3/2007 | Van Horn et al. |
| 7,263,498 | B1 | | 8/2007 | Van Horn et al. |
| 7,299,206 | B2 | | 11/2007 | Taylor et al. |
| 7,363,246 | B1 | | 4/2008 | Van Horn et al. |
| 7,376,611 | B1 | | 5/2008 | Jones |
| 7,376,617 | B2 | * | 5/2008 | Jones ............................. 705/37 |
| 7,386,476 | B1 | | 6/2008 | Shavanadan et al. |
| 7,386,484 | B1 | | 6/2008 | Cuzzocrea |
| 7,437,306 | B1 | | 10/2008 | Bayer |
| 7,467,103 | B1 | | 12/2008 | Murray et al. |
| 7,480,627 | B1 | | 1/2009 | Van Horn et al. |
| 7,529,691 | B2 | | 5/2009 | Cichanowicz |
| 7,552,067 | B2 | * | 6/2009 | Nephew et al. ............... 705/7.25 |
| 7,610,212 | B2 | * | 10/2009 | Klett et al. .................... 705/7.12 |
| 7,747,473 | B1 | * | 6/2010 | Mesaros ....................... 705/26.2 |
| 7,756,753 | B1 | | 7/2010 | Mcfarland |
| 7,778,884 | B2 | | 8/2010 | Bamborough et al. |
| 7,818,212 | B1 | | 10/2010 | Mesaros |
| 7,937,294 | B1 | | 5/2011 | Murray et al. |
| 2001/0039519 | A1 | | 11/2001 | Richards |
| 2002/0023044 | A1 | | 2/2002 | Cichanowicz |
| 2002/0069134 | A1 | * | 6/2002 | Solomon .......................... 705/26 |
| 2002/0069166 | A1 | | 6/2002 | Moreau et al. |

(Continued)

OTHER PUBLICATIONS

International Search Report in PCT/US2013/025422,pp. 1-12.

(Continued)

*Primary Examiner* — Thomas Dixon
*Assistant Examiner* — Benjamin S Fields
(74) *Attorney, Agent, or Firm* — Gordon Kessler

(57) ABSTRACT

A method, computer program and single enterprise resource planning (ERP) system for procuring a product or service. The single ERP system includes an input for receiving information relating to product demand for a plurality of end users via a cooperative buying group, a predictive engine for accumulating the received product demand into a single demand schedule and an output for transmitting the single demand schedule to a manufacturer/original source of the product. An optimization engine is provided for receiving product availability information from the manufacturer/original source of the product by the cooperative buying group, and for determining one or more options for ordering the products. A procurement system is also included for providing the product availability information to the one or more options for ordering the products, for receiving one or more product orders, for ordering product from the manufacturer/original source of the product, and for managing shipping the product.

74 Claims, 9 Drawing Sheets

(56) References Cited

U.S. PATENT DOCUMENTS

| | | |
|---|---|---|
| 2002/0138400 A1 | 9/2002 | Kitchen et al. |
| 2003/0023500 A1 | 1/2003 | Boies et al. |
| 2003/0065591 A1 | 4/2003 | Jones |
| 2003/0065592 A1 | 4/2003 | Jones |
| 2004/0093175 A1* | 5/2004 | Tan .................................. 702/61 |
| 2005/0177435 A1 | 8/2005 | Lidow |
| 2005/0197896 A1* | 9/2005 | Veit et al. ........................ 705/14 |
| 2005/0246240 A1 | 11/2005 | Padilla |
| 2005/0273377 A1 | 12/2005 | Ouimet et al. |
| 2005/0288953 A1 | 12/2005 | Zheng |
| 2006/0069635 A1 | 3/2006 | Ram et al. |
| 2006/0085285 A1 | 4/2006 | Cichanowicz |
| 2006/0150218 A1 | 7/2006 | Lazar |
| 2006/0155603 A1 | 7/2006 | Abendroth et al. |
| 2008/0177641 A1 | 7/2008 | Herniak et al. |
| 2008/0300998 A1 | 12/2008 | Harkabi |
| 2008/0301003 A1 | 12/2008 | Harkabi et al. |
| 2009/0099879 A1 | 4/2009 | Ouimet |
| 2010/0262478 A1 | 10/2010 | Bamborough et al. |
| 2010/0318435 A1 | 12/2010 | Ramanathan et al. |
| 2011/0050397 A1 | 3/2011 | Cova |

OTHER PUBLICATIONS

US 6,047,266, 04/2000, Van Horn et al. (withdrawn)

\* cited by examiner

METHOD AND APPARATUS FOR PROCUREMENT AGGREGATION

FIELD OF THE INVENTION

This invention relates generally to a method and apparatus for aggregation of procurement of products and services at a much lower cost than individual enterprises can accomplish solely or conjunctively and more particularly to a method and apparatus for the disintermediation and aggregation of purchasing and acquisition of products and services for various (or all) industries in a way that provides efficient procurement of those products and services.

BACKGROUND OF THE INVENTION

Individual Enterprises are constantly seeking ways to increase efficiencies and reduce expenses in positive economic periods and especially in poor economic periods. This drive for efficiency can be seen during the continuing escalation of costs from 2005-2010 coupled with the financial meltdown of late 2007-2009. This poor economic period created a tremendous demand for efficiency in many businesses. Efficiency, in this case, is meant, "to provide the same or greater quality of products and services at a lower cost to the enterprise, therefore stabilizing or diminishing the cost to their constituency (for example, consumer, student, guest, member, patron, patient, clients, citizen, taxpayer, etc.)." By diminishing the cost of products and services that enterprises utilize and configure to satisfy the demands of their paying constituencies, enterprises, comprising any entity that may purchase goods or services to convert into another product or service to be delivered to a constituent, and may include institutions, businesses, governments and the like, may offer higher quality products and services at a lower cost to their constituencies.

In the United States, by way of example only, the Hospitality (clubs, hotels, resorts, cruise lines, etc.), Education (Universities, Colleges, and other educational facilities, public and private), HealthCare (Hospitals, Nursing Home, senior assisted living, etc.), and Banking and Financial industries including Banks such as; Bank of America, Citigroup, JP Morgan/Chase, UBS, etc. financial institutions such as; Blackstone, KKR, Apollo, Greenhill and Co., etc: including cooperatives of commercial building tenants, a block of commercial building tenants, blocks of commercial building tenants, a metropolitan area of tenants, a city of tenants and even a country of tenants, etc. . . . ) conservatively procure a combined $3.2 trillion of products and services each year. These industries are comprised of tens of thousands of enterprises that consume finished goods and services in order to in turn provide their product or service to their constituencies. These goods and services comprise the crucial components necessary for the various operations (enterprises) to execute their respective businesses and satisfy the needs of their constituencies (guests/patrons/members/students/patients/clients/etc. . . . ). The products and services that the enterprises procure can range from as little as 5%-75% or more of the operation's gross receipts. Any other industries may have similar product and procurement costs, and may similarly benefit from the various embodiments of the invention.

Mitigating operational, product, and service costs is a core objective in depressed and booming economies alike. There has always been pressure on management to lower costs while still maintaining the same level of quality. While this is especially heightened during difficult financial times such as our current economic environment, this pressure on management does not dissipate when the economy is robust. The financial meltdown of late 2007-present (effectuating record declines in revenues, endowment funds, state funding, government funding, and assistance, and rising medical costs, etc. . . . ), coupled with rising operating costs, has put immense pressure on industries' management to restructure forecasts, budgets, etc. Challenges to operators have not been limited strictly to financial pressure. The last decade has forged a socio-economic transformation from a convergence of economic and behavioral changes of guests, patrons, members, students, clients, taxpayers, and patients, etc., who are more demanding than ever. This value conscience transformation is expected to continue into the foreseeable future.

Operators of individual enterprises. communities, municipalities, cities, states, nations, governments, etc. may be limited in their ways of mitigating costs, and many reductions in costs tend to create additional problems. For instance, reducing an enterprise's labor expense essentially diminishes service and negatively impacts the quality of product and/or service that an enterprise offers. An enterprise's attempt to cut quality and services and/or increasing prices (or taxes, levies) challenges its value propositions and can cause a decline, discontinuation of use, disgruntled constituencies, and possibly even social unrest.

The best way to reduce costs is to maintain or improve the quality of products and services that an enterprise procures, but at lower prices to the operator, government, etc. Several factors currently prevent single (or even multi-unit) industries' enterprises from achieving true and sustainable savings in procurement costs and quality of purchases. First, the core competency of management in these industries is predicated on delivering the ultimate in consumer (constituency) satisfaction and not in efficient procurement methodologies. Second, even skilled and experienced procurement managers cannot simply bypass the mainstream supply chain. This supply chain contributes to the multiple-layered infrastructure and distribution costs that are unavoidable to the end users (e.g. hotels, clubs, resorts, cruise lines, hospitals, colleges and universities, banks and financial institutions, and even governments) under the current systems.

It would be therefore beneficial to provide an improved method and system that allows for the delivery and procurement of such goods and services in an efficient manner, and that overcomes the drawbacks of the prior art.

SUMMARY OF THE INVENTION

In accordance with various embodiments of the invention one or more consolidated ERP systems are provided in which information is shared at various components of an improved supply chain, thus reducing the length of that chain, reducing the time from production to end user, and providing valuable demand information to producers and third party logistics to aid in production scheduling and logistics. This inventive "single ERP" system may allow for producers and $3^{rd}$ party logistics enterprises to transition from a "made to stock" business model, in which products are produced and inventoried at multiple levels of distribution in anticipation of projected future demand, to a "made to order" business model, in which products are produced to satisfy real demand for the present and the future. Embodiments of the invention employ the process of disintermediation, defined as the exclusion of all middlemen between manufacturer or original source and the end user. In essence, all intermediaries that do not add value to the physical good or service are preferably removed from the supply chain, and consequently all of their associated or redundant costs are not passed on to the end user or customer (constituency).

An individual enterprise's operators are limited in their ways of mitigating costs, and many reductions in cost tend to create additional problems. For instance, reducing an enterprise's labor expense essentially diminishes service and negatively impacts the quality of product and/or service that an enterprise offers. Another methodology deployed by some enterprises involves reducing the quality of goods and services that they procure to attempt to satisfy their demanding clientel. An enterprise's attempt to cut quality and services and/or increasing prices challenges its value propositions and can cause a decline or discontinuation of use or satisfaction.

The best way to reduce costs is to maintain or improve the quality of products and services that an enterprise procures, but at lower prices to the operator, enterprise, or government. Several factors currently prevent single (or even multi-unit) industries' enterprises, communities, states or other governmental entities (collectively "entities"), or any entity that purchases good and/or services in order to provide their final product to their constituencies from achieving true and sustainable savings in procurement costs and quality of purchases. First, the core competency of management in these industries is predicated on delivering the ultimate in consumer (constituency) satisfaction and not in efficient procurement methodologies. Second, even skilled and experienced procurement managers cannot simply bypass the mainstream supply chain. This supply chain contributes to the multiple-layered redundant infrastructure, occupancy, operating and distribution costs that are unavoidable to the end users (hotels, clubs, resorts, cruise lines, hospitals, colleges and universities, banks and financial institutions, governments, states, communities and a host of other entities) under the current systems.

Entities generally spend 80% of their expense for products and services (expenses) on 20% of the products and services they purchase. Implementation of various embodiments of the present invention may provide a system that will identify products and services which constitute that 20% of the products and services for targeted industry specific enterprises, and support the creation and functioning of industry-specific buying co-operatives that reduce costs for all enterprises in that particular industry not only by bypassing distributors and wholesalers, but by exercising the sheer purchasing power that the needs of combined enterprises in an industry generate. Information flow will be improved to encourage more efficient production, logistics, and distribution, thus decreasing costs throughout the system that may be shared by all constituents or sectors of this new supply chain. Additional cross-industry-(or multi-industry) buying cooperatives may be provided to support purchase of the other 80% of products and services that make up 20% of enterprise's spend. Because of the lower level of spending on these products by each enterprise, and consequently each industry, the combination of various industries into a single buying cooperative allow for similar benefits as the industry-specific cooperative groups, but for the less-used or less valuable products and services.

Various embodiments of the present invention therefore may provide a platform and channel for the individual enterprises to aggregate their demand into volume levels that are necessary (and advantageous) for procurement direct from the original source of the goods and services. Embodiments of the present invention may also provide for $3^{rd}$ party logistics enterprises to carry out the function of logistics and fulfillment with greater efficiency and lower cost. Through the use of expert procurement partners, the aggregated individual enterprises' demand needs may be efficiently procured. Logistical experts may also provide the functionality of fulfillment logistics to bring to the enterprises their demand needs as required without the multiple redundant and/or costly factors that presently exist in the current supply chain.

One factor that may contribute to the deterioration of the quality of some products is the length of time it takes for a product to navigate the multiple levels of distribution and arrive from the point of origin to the point of final delivery (multiple handling through supply chain participants or companies), and including associated inventory level requirements at each level of distribution, including at the original source of the goods. Implementation of one or more embodiments of the present invention may mitigate delivery time and handlings by eliminating intermediaries and expedite the time and touches required for the product to arrive from the source to the point of delivery. Reducing the timeline and touches for deliveries only enhances product quality for a myriad of product categories, while reducing redundant supply chain inventory of products. Customizing products to better meet industry needs can also improve quality. Aggregating volume by cooperative members of the specific industries and dealing direct with a source of goods may give industry participants the benefit for negligible incremental cost (which will be minute in comparison to the savings derived from the disintermediation of the supply chain) to customize and manufacture products that gratify a particular functional need of an operation. By making goods to order based upon determined future and present industry needs, rather than making goods to fill various inventories in the existing supply chain, redundant inventory may be eliminated, and excess production may be avoided. End users receive desired goods and services as needed, for minimum cost.

Still other objects and advantages of the invention will in part be obvious and will in part be apparent from the specification and drawings.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
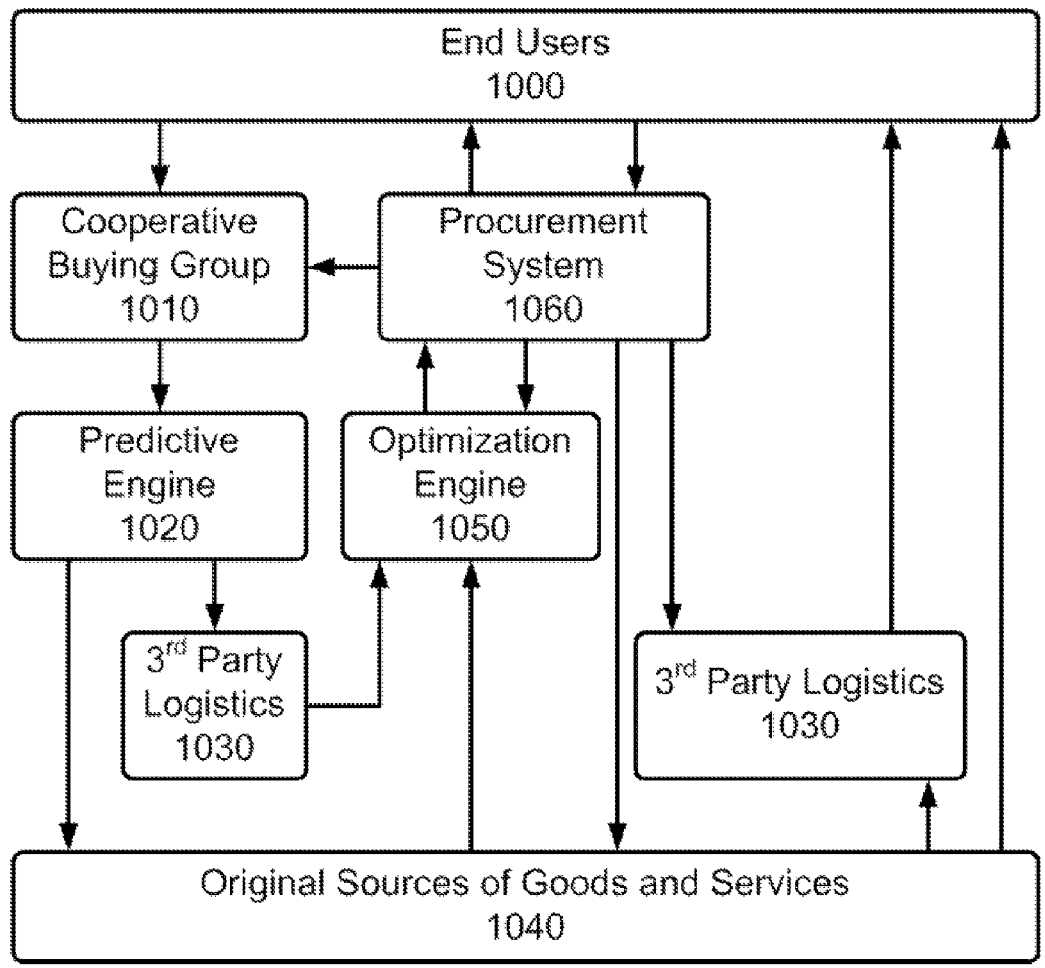
FIG. 1 is a flowchart diagram depicting a flow of information and goods and services in accordance with an embodiment of the procurement system in accordance with the invention.

The invention will now be described making reference to the following drawings in which like reference numbers denote like structure or steps. FIG. 1 depicts a high level view of the flow of information and goods (and/or services) resulting from the use of a consolidated single ERP encompassing from end user consumption to logistical needs through to manufacturer and original sources of products and services, a seamless information and procurement system and all its benefits in accordance with an embodiment of the invention. As is shown in FIG. 1, one or more end user enterprises 1000 provide past and current needs for one or more goods and services (consumption history). This information preferably spans retroactively for three or more years, but may span any desirable time period. This information is preferably consolidated at a cooperative buying level 1010 for all end user enterprises 1000 associated with the particular buying cooperative. Such a buying cooperative may comprise a plurality of end user enterprises 1000 from a single industry, or may alternatively comprise a number of end user enterprises 1000 from multiple industries.

For products purchased in large quantities by end user enterprises associated with a particular industry (such as the estimated 20% of products that typically make up 80% of expense for such end users) it is contemplated in accordance with an embodiment of the invention, that industry specific buying cooperatives may be formed. Additionally, because products purchased in lesser quantities or of lesser value (such as the estimated 80% of products that typically make up 20% of the expense for such end users) may not provide sufficient economies of scale among entities of a single industry, it is contemplated in accordance with an embodiment of the invention, that cross-industry buying cooperatives may be formed in order to cooperatively purchase these goods and services.

In either event, such consolidated demand information may be provided from cooperative buying group 1010 as singular and aggregate enterprise consumption behavior, to a predictive engine 1020, which employs the accumulated demand information to predict product, services and $3^{rd}$ party logistics demand for particular products and services over time by the consolidated cooperative buying group 1010. Once this future and present demand has been predicted, this information is then preferably provided to an original source of goods and services 1040, and may also be provided to a $3^{rd}$ party logistics provider 1030.

After receipt of such predictive demand information by the original source of goods and services 1040 and $3^{rd}$ party logistics provider 1030, each such entity may provide production and delivery pricing and scheduling (such as lead time, bulk order information, etc.) to an optimization engine 1050. The optimization engine may provide various ordering possibilities to a procurement system 1060, which in turn preferably presents this information to the one or more end users 1000 associated with the cooperative buying group 1010. This information is preferably provided via an industry specific website, multi-industry website, or other information provision system, and allows for individual ordering by each end user entity 1000 in accordance with the provided pricing and availability information. Various suggestive and other optimization processes may be employed, as described in accordance with the optimization engine, below.

As is further shown in FIG. 1, each end user entity 1000 may order desired good and services through procurement system 1060 maintained in accordance with cooperative buying group 1010. Preferably, members of a particular cooperative buying group are located in some predefined geographic proximity to allow for efficiency in product and service delivery, but any geographic location(s) may be employed. This individual procurement information may then be forwarded to both $3^{rd}$ party logistics provider 1030 and original sources of goods and services 1040 from procurement system 1060 as particular orders for those goods and services, and for associated $3^{rd}$ party logistics needs. Any need for the inclusion or level of participation of these $3^{rd}$ party logistics providers will be determined as described in greater detail below. The individual procurement information may further be provided to optimization engine 1050 in order to update the various information provided thereby. This updated information may then be employed in order to update the procurement system to allow one or more end users 1000 to make optimum cost saving decisions about purchase and delivery (i.e. date, time, quantity, etc.) of available goods and/or services.

After such ordering, the original source of the goods and services 1040 preferably produces or otherwise supplies these goods and service, and delivers these goods and services to either one or more end users 1000 directly, or to a $3^{rd}$ party logistics provider 1030 for breaking bulk shipments, and further forwarding these smaller shipments to the one or more end users 1000. International orders may require additional steps, such as overseas shipping etc. It is contemplated that the above-described delivery may comprise a complete shipping and fulfillment process, or alternatively, may comprise a final shipping step or steps in what may be a short or longer logistics process dependent upon specific additional needs that may be present when global manufacturers or original sources of goods and service are employed.

Figure 8:
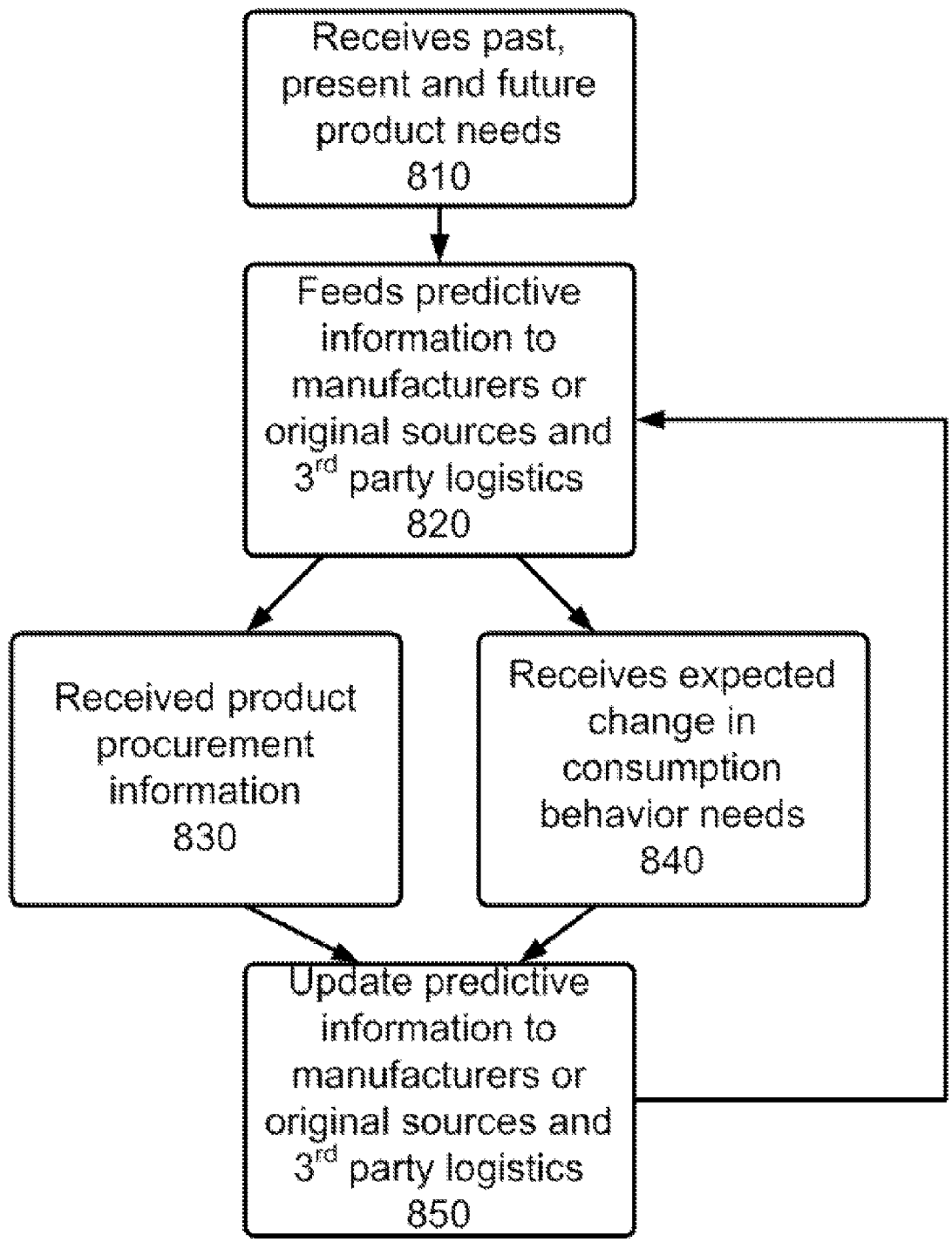
FIG. 8 is a flowchart diagram depicting functionality of a predictive engine in accordance with an embodiment of the invention.

Referring next to FIG. 8, a flow of information to and from predictive engine 1020 will now be described. As is shown in FIG. 8, at step 810 the predictive engine (1020 in FIG. 1) receive past, present and future product needs from one or more cooperative buying groups 1010. Then at step 820, this accumulated predictive (present and future) information is preferably forwarded to manufacturers or original sources of goods and services 1040 and $3^{rd}$ party logistics providers 1030, allowing them to provide (present and future) information regarding product and logistics availability and pricing. Once the overall procurement system is in use, as one or more end users 1000 and cooperative buying groups 1010 purchase goods and/or services, this procurement information is provided to the predictive engine at step 830, allowing an update thereof. Similarly, at step 840, any expected changes in consumption behavior needs for one or more end users 1000 is reported to the predictive engine, similarly allowing for the update to any predictive information provided therefrom. This updated information is then provided back to the manufacturers or original sources of goods and services and $3^{rd}$ party logistics providers at step 850, and the processing returns to step 820. In this manner, predictive information upon which manufacturers or original sources of goods and services and $3^{rd}$ party logistics providers make production, availability, pricing and other decisions may always be the most current information.

Figure 9:
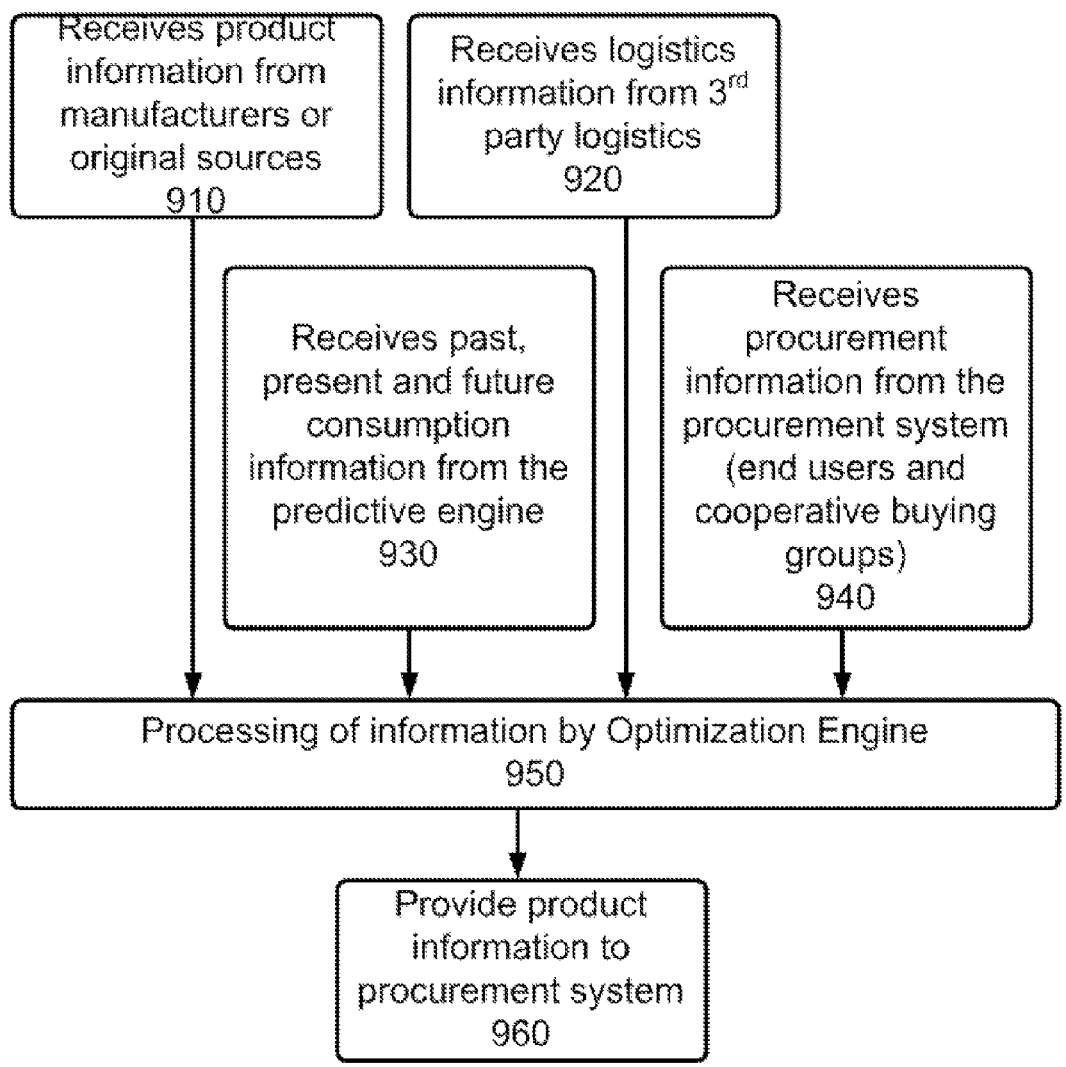
FIG. 9 is a flowchart diagram depicting functionality of an optimization engine in accordance with an embodiment of the invention.

Referring next additionally to FIG. 9, a flow of information to and from optimization engine 1050 is shown. As is shown in FIG. 9, optimization engine 1050 receives product information, availability and pricing from manufacturers or original sources of goods and services at step 910, receives logistics information, availability and pricing from 3$^{rd}$ party logistics providers at step 920, receives past, present and future consumption information from the predictive engine at step 930, and receives procurement information from the procurement system 1060 at step 940. At step 950 this information is processed by the optimization engine 1050. Then at step 960, this optimized product availability, price and other attributes are preferably forwarded to procurement system 1060 for use by the independent end users 1000 to maximize efficiency of ordering. In this manner, end users 1000 are always presented with the most up to date information regarding product, service availability and choices to optimize cost savings.

Figure 2:
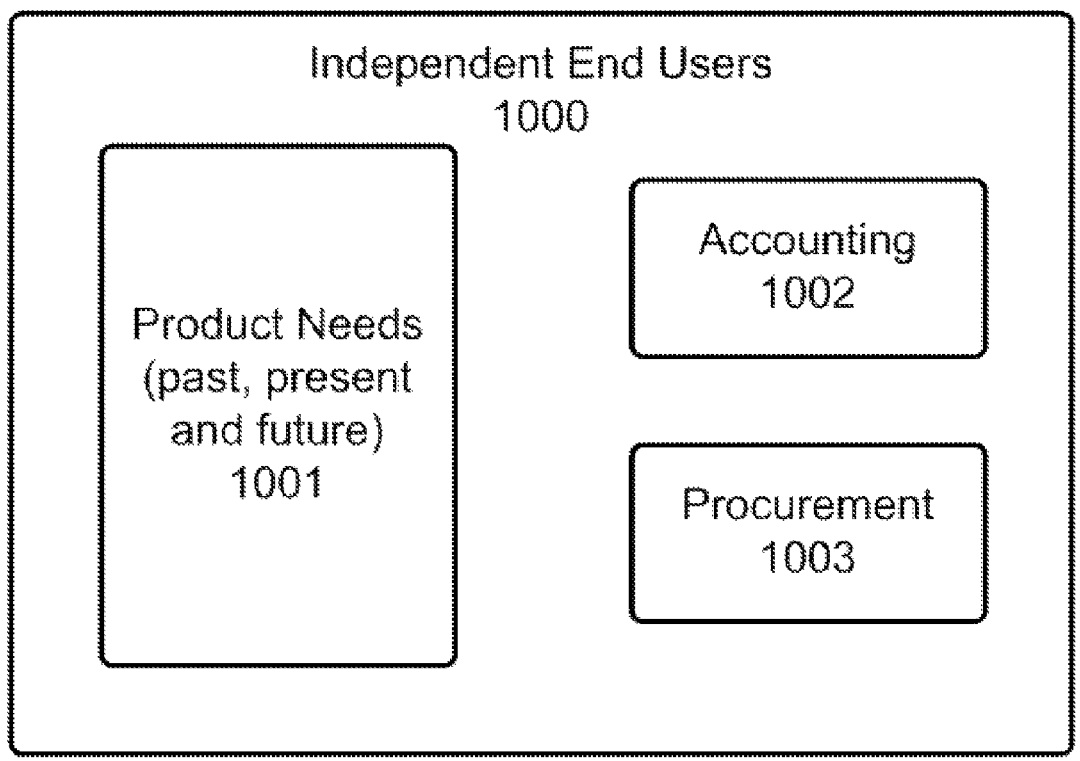
FIG. 2 is a block diagram depicting the details of one or more independent end users in accordance with one or more embodiments of the invention.

Each aspect of the data and product will now be described in greater detail. Referring next to FIG. 2, details associated with the preferred transfer of past, current and future needs for one or more goods and services from the one or more end users 1000 to cooperative buying group 1010 will be described. Each individual end user 1000 may include one or more ERP modules. Those shown may include an accumulation of past, present and estimated or actual future product needs 1001, an accounting system 1002, and one or more procurement functions 1003. Of course, additional individual modules may also be employed as desired and as may be appropriate for each individual end user, such as inventory management, sales organization and the like. For one or more end users may not include electronically stored information. In such a situation, information may be manually accumulated, through the review of paper or other non-electronic records related to past purchases, and past and present demand and sales or other figures.

Figure 3:
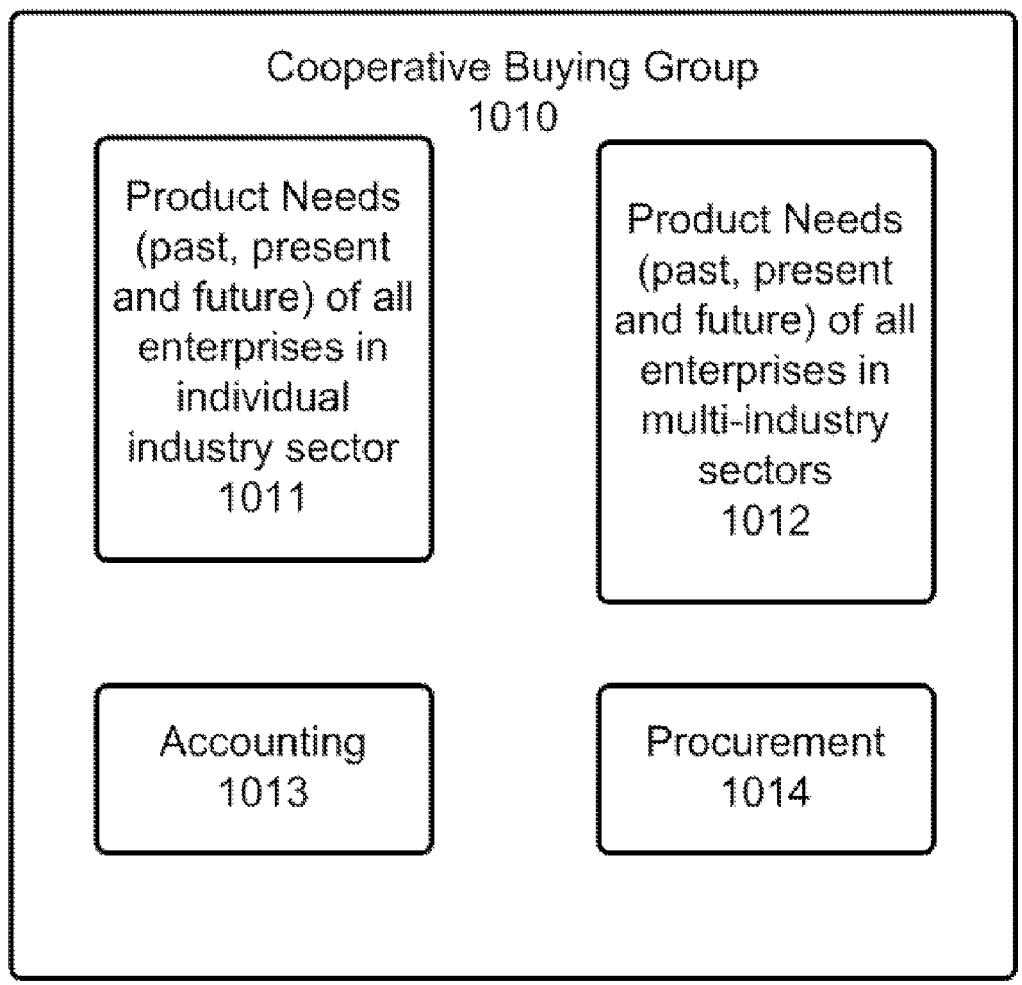
FIG. 3 is a block diagram depicting the details of one or more cooperative buying groups in accordance with an embodiment of the invention.

It is anticipated in accordance with one or more embodiments of the invention, that information from each individual end user be accumulated in accordance with the one or more cooperative buying groups 1010, as noted above. As is shown in FIG. 3, past and present and future product use 1001 (FIG. 2) from each individual end user 1000 are preferably provided to one or more of cooperative buying group 1010 modules 1011, 1012. As noted above, for products purchased in large quantities by end user enterprises associated with a particular industry (such as the estimated 20% of products that typically make up 80% of expense/spend for such end users), such information may be provided to module 1011. As further noted above, because products purchased in lesser quantities, or of lesser cost (such as the estimated 80% of products that typically make up 20% of the expense/spend for such end users) may not rise to the level needed to reduce costs in production and/or delivery, it is contemplated in accordance with an embodiment of the invention, that multi-industry information may be provided to module 1012. It should be noted that each individual cooperative buying group 1010 may be formed as an industry-specific cooperative buying group, thus including only module 1011, and not module 1012, or as a multi-industry cooperative buying group, and thus including module 1012 and not module 1011, or as a single cooperative buying group including both modules 1011 and 1012, possibly consolidating activities for multiple industries. In such a scenario, multiple modules 1011 may be provided for each industry, and a single module 1012 for the purchase of cross-industry goods and services among the industries included in the cooperative buying group 1010.

Such past, present and future consumption behavior for the consumption of goods and services for all end users 1000 associated with a particular cooperative buying group 1010 are accumulated at the particular modules 1011 or 1012 as appropriate. As noted in FIG. 1, this information is then forwarded to predictive engine 1020 in order to predict product and/or services and 3$^{rd}$ party logistics demand (where required) for particular products over time by the consolidated cooperative buying group 1010. Of course, such predictive demand information may be determined for multiple cooperative buying groups. Once this future and present demand has been predicted, this information is then preferably provided to an original source of goods and services 1040, and may also be provided to a 3$^{rd}$ party logistics provider 1030

It is contemplated in accordance with embodiments of the invention that such a system may evolve into a perpetual inventory system ("Just in Time"), and perpetual ERP between manufactures and original sources of goods and services, 3rd party logistics and fulfillment providers and individual end user entities. Known upcoming demand and expected and actual tracked changes in stock levels at a particular end user or users are automatically addressed. The manufacturers and original sources of goods and services preferably produce and provide these goods and services, 3rd party logistics and fulfillment perform their required execution proactively in response to accurate, predicted and actual changes in stock levels and response requirements, rather than retroactively to specific orders for those goods or services by individual end users and their cooperatives.

Figure 4:
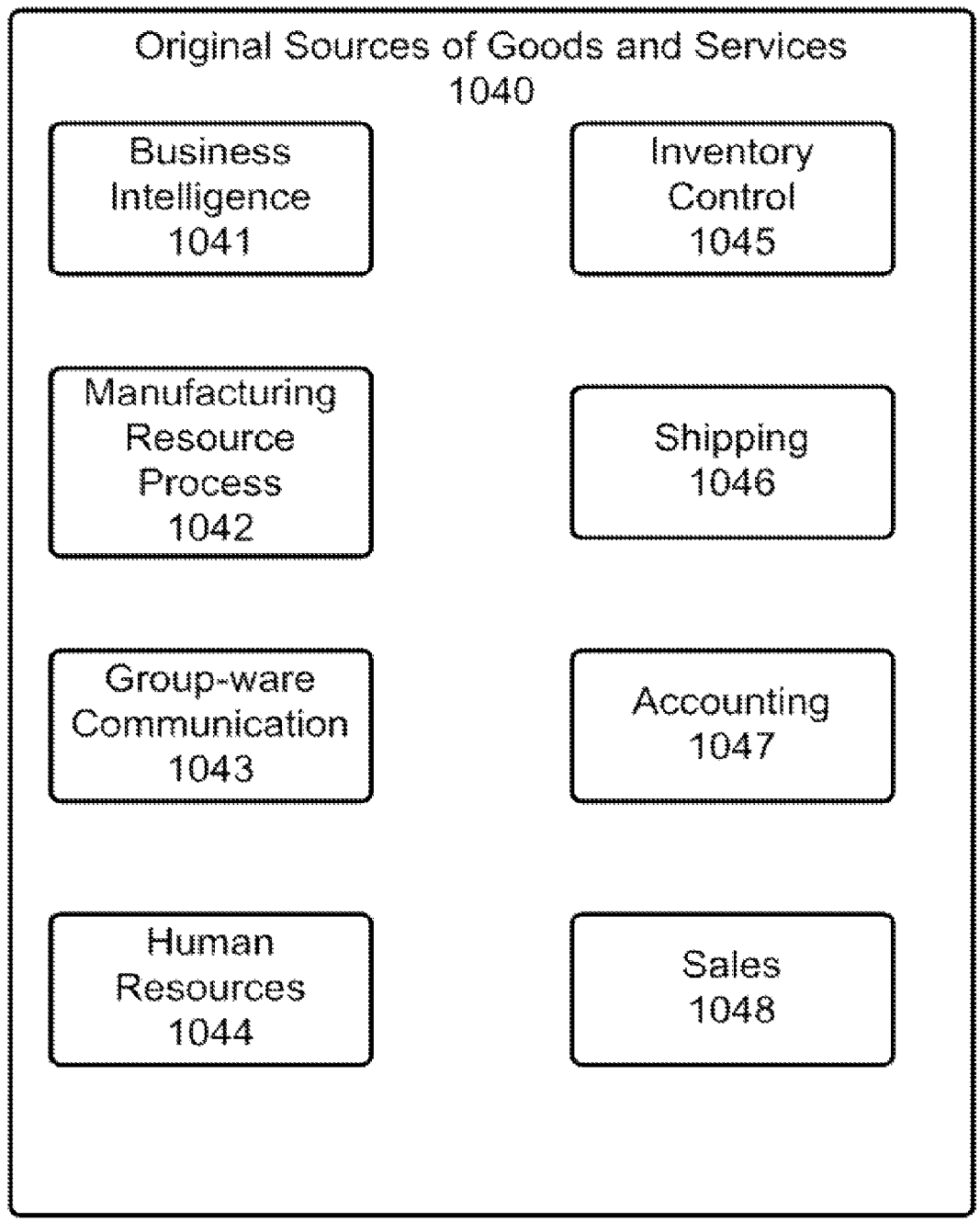
FIG. 4 is a block diagram depicting the business functionality details of one or more manufacturers/original sources of products and services in accordance with an embodiment of the invention.

Referring next to FIG. 4, details associated with one or more original sources of goods and services 1040 will be described. As is shown in FIG. 4, such manufacturers may include all intermediate processes required for the production and integration of product's components. Such manufacturing may comprise the use of machines, tools or labor to produce final (finished) goods for user or sale. Each such manufacturer or original source of goods and services (defined as the last leg of value creation of finished goods) typically employ an Enterprise Resource Planning (ERP) tool that may be enterprise or conglomerate specific. For such a manufacturer or original source of goods and services 1040, such an ERP may include any number of modules, such as business intelligence 1041, manufacturing resource processing 1042, group-ware communications 1043, human resources 1044, inventory control 1045, shipping 1046, accounting 1047 and sales 1048, by way of example only. Additional modules may be included as desired by the individual entity, or different functionality may be provided for use by certain manufacturers or original sources of goods.

Thus, predictive demand information provided from predictive engine 1020 is preferably provided to one or more modules of the ERP system of the appropriate manufacturer or original source of goods and services 1040, including one or more of business intelligence 1041, manufacturing resource processing 1042, group-ware communications 1043, human resources 1044, inventory control 1045, shipping 1046, and sales 1048. This information is preferably employed by manufacturer or original source of goods and services 1040 in order to adjust one or more elements of their operation in order to be able to provide made to order product manufacturing and delivery. By knowing predictive demand information, each module of the ERP system of the manufacturer or original source of goods and services 1040 may be employed to prepare for upcoming demand and enjoy all of the benefits of knowing what the future demand may bring. The advantages to manufacturers or original sources of goods and services 1040 affords extreme efficiency for this sector of commerce such as definitive knowledge of producing products and services for today and the future when they are to be utilized by individual end users 1000, resulting in the sector of commerce converting to the ultimate efficiency of "Made to Order" or "Just in Time". This extreme advantage allows; better manufacturing capacity utilization, more efficient raw material procurement, better human resource requirement management, advantageous cash flow and requirement planning, improved ability for planning and purchasing energy needs, beneficial capital asset management, improved sales and marketing, including rational planning related to revenues and expenses, reduction in just in time inventory costs, etc..... Knowing the future brings the ultimate economic and structural advantages to the commerce sector 1040 manufacturers and original sources of products and services.

Figure 5:
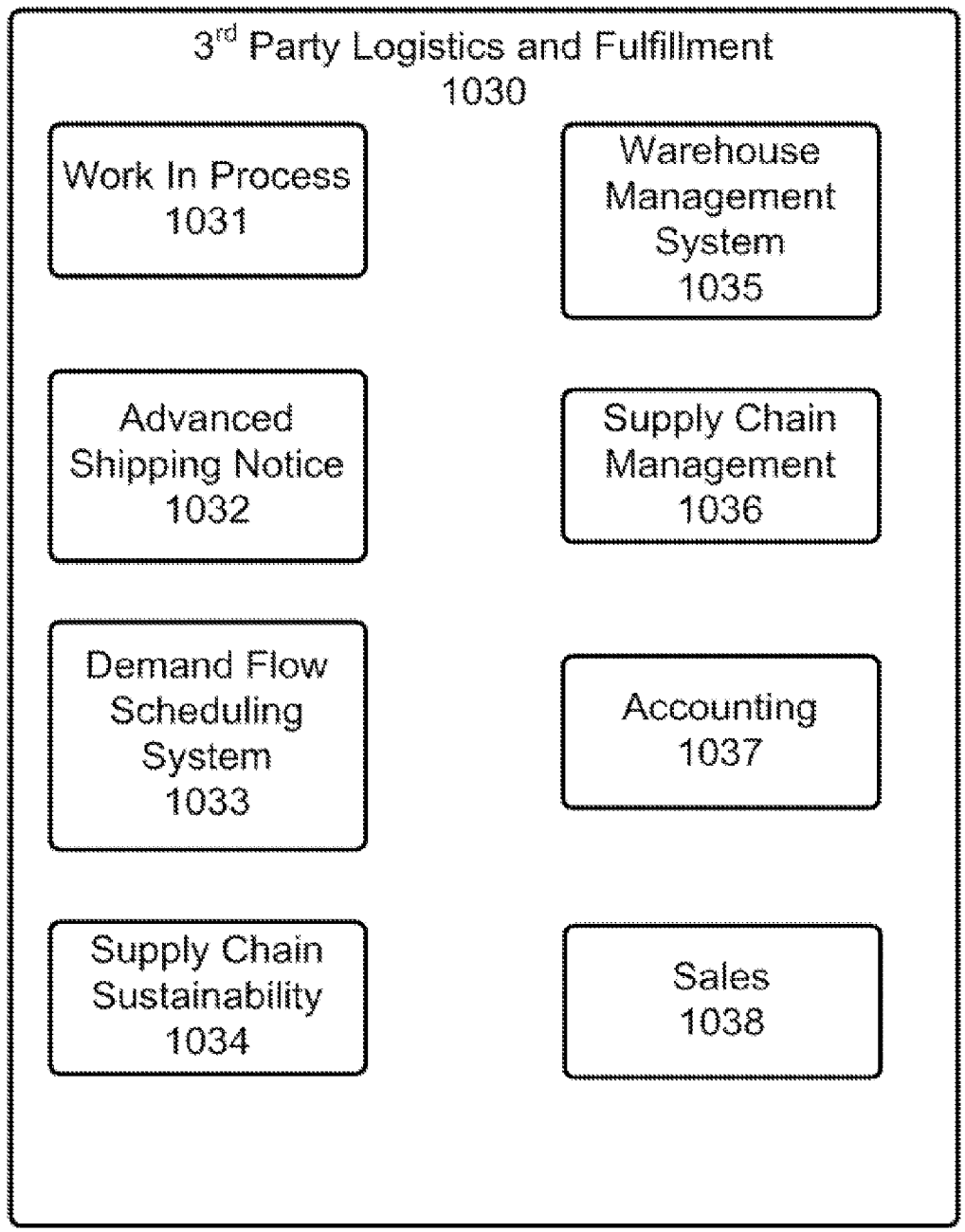
FIG. 5 is a block diagram depicting the details of one or more $3^{rd}$ party fulfillment/logistics entities in accordance with an embodiment of the invention.

Referring also to FIG. 5, each $3^{rd}$ party logistics and fulfillment entity 1030 may similarly include an ERP system that may be enterprise or conglomerate specific, and may further include one or more modules customized for this or multiple fulfillment type entities. Thus modules such as work in process 1031, advanced shipping notices 1032, a demand flow scheduling system 1033, a supply chain sustainability module 1034, a warehouse management system 1035, supply chain management 1036, accounting 1037 and sales 1038 may be provided. Predictive demand information from predictive engine 1020 is preferably provided to one or more modules, such as work in process 1031, advanced shipping notices 1032, a demand flow scheduling system 1033, a supply chain sustainability module 1034, a warehouse management system 1035, and sales 1038. This information is preferably employed by $3^{rd}$ party logistics provider 1030 in order to adjust one or more elements of their operation in order to be able to provide "Made to Order" logistics and fulfillment, or "Just In Time" delivery and other logistical support. By knowing predictive demand information, each module of the ERP system of the $3^{rd}$ party logistics provider may be employed to prepare for upcoming demand and enjoy all the benefits of knowing what the future demand brings. The financial advantages of known actual future demand that the "Made to Order" or "Just in Time" business process, described here, results in the ultimate efficiency for the commerce sector 1030 3rd Party Logistics and Fulfillment. While prior art systems have allowed for the passage of information from retailer to upstream product/manufacturer or logistics provider, for example, no such prior art system has allowed for the complete integration of the supply chain, from individual end user to manufacturers/producers or original sources of goods and services, and $3^{rd}$ party logistics providers. Allowing for the use of past, present and predictive future demand from the individual end users, manufacturers/producers or original sources of goods and services and $3^{rd}$ party logistics providers are able to operate in a just in time or made to order manner. Their operations may be based upon actual and predictive consumption patterns in accordance with consumption data retrieved from the individual end users, industry-specific enterprises and multi-industry aggregation of enterprises.

Once manufacturers or original sources of goods and services 1040 and $3^{rd}$ party logistics providers 1030 have received and processed this predictive demand information based upon present and future consumption patterns, preferably making the above-noted adjustments in their own processing, they are able to provide supply, delivery and present and future pricing information to optimization engine 1050. It is anticipated that such supply, delivery and pricing information will be on very beneficial terms for end users 1000, as relative certainty in demand allows for the manufacture of/for precisely the correct amount of goods, or provision of the correct amount of services. There is no need for production or provision of excess capacity. Furthermore, as noted above, removal of various intermediary levels of distribution not only reduces the cost of storage of such goods, inventory and the removal of the redundant infrastructure and occupancy costs at each such intermediary level, but also improves the quality of the predictive demand information, thus allowing the manufacturers or original sources of goods and services 1040 and $3^{rd}$ party logistics providers 1030 to be more confident in this predictive data, allowing for more precise tuning of production and delivery schedules. This reduction resulting from efficient inventory controls and the other improved aspects of the described process contributes to an overall savings to users throughout the ordering and delivery system, a cost savings ultimately passed on to end users 1000.

As described above with respect to FIG. 9, optimization engine 1050 collects information from manufacturers or original source of goods and services 1040, $3^{rd}$ party logistics providers 1030, past, present and future consumption information from the predictive engine 1020, and procurement information from the procurement system 1060 so that individual enterprises, through their associated cooperative buying groups (either industry specific or multi-industry) can purchase goods and services as desired, maximizing the cost reduction benefits of lowest price for desired products and services. By maximizing timing of volume requirements, by aggregating other individual enterprises consumption requirements for required products and services, and by advising the ordering enterprise end user how to maximize their cost savings for product and service acquisition and logistics, individual enterprises within specific geographic areas of demand are able to disintermediate the supply chain and receive goods and services at the lowest total cost. By accurately predicting manufacturers or original sources of goods and services capacity, availability of goods and services in light of enterprises and co-operative demands, manufacturers and original sources of goods and services and $3^{rd}$ party logistics providers may make available the lowest price possible for desired products and services for the end user individual enterprises, through the cooperative buying groups. The optimization engine thus also maximizes cost reductions for the $3^{rd}$ party logistical functionality to distribute and fulfill the goods and services purchased direct from the manufacturers or sources of goods and services to the individual enterprises that comprise the cooperative buying groups based on the timing, capacity availability, routing options and costs, and quality control of logistics to satisfy the individual end users' needs of timing, quality control, and cost effectiveness. The optimization engine may act to assist the procurement system to in turn function as an automated procurement and ordering tool as end users deploy and practice a functional "single ERP system" execution of perpetual inventory between end users, manufacturers or original sources of goods and services, and $3^{rd}$ party logistics suppliers. Such a shift will result in manufacturers or original sources of goods and services and $3^{rd}$ party logistics providers transforming into "made-to-order" and/or "Just in Time" industries.

If manufacturers and original sources of goods and services 1040 shift from "made-to-stock" to "made-to-order" (Just in Time, "JIT"), then the expended resources of inventory at the manufacturer level and the redundant cost of inventory levels through different levels of the supply chain may be eliminated. "Made-to-order" also allows the manufacturer and original source of products and services to plan their future utilization of manufacturing capacity (capacity planning, work in progress "WIP", etc.), raw material utilization, HR needs, marketing requirements, energy utilization, cash and capital requirements, and many other factors in a much more efficient mechanism that result in tremendous efficiency and cost savings. Similarly, 3$^{rd}$ party logistics providers 1030 will benefit by knowing demand for the future (instead of guessing). This will allow 3$^{rd}$ party logistics providers 1030 to be more efficient in knowing what their; capacity utilization of work in process "WIP", advance shipping notice "ASN", demand flow scheduling, supply chain sustainability, warehouse management "WMS", supply chain management, facility and asset utilization, energy utilization and cost, marketing, cash flow, HR needs, and capital expenditures. This knowledge and the efficiencies it creates result in tremendous cost savings for 3$^{rd}$ party logistics providers. The result of the capability for manufacturers and original sources and 3$^{rd}$ party logistics providers to be able to change their model from "made-to-stock" to "made-to-order" (JIT) results in tremendous cost savings and efficiencies for: end user individual enterprises; the co-operatives; 3$^{rd}$ party logistics providers; and manufacturers and original sources of products and services, alike.

As noted above with respect to FIG. 9, optimization engine 1050 receives all such availability, scheduling and delivery information from manufacturers or original sources of goods 1040 and 3$^{rd}$ party logistics providers 1030, past, present and future consumption information from the predictive engine 1020, and procurement information from the procurement system 1060, and accumulates this information in order to provide real time pricing and delivery information to end users, through procurement system 1060, including modules 1003 and 1014, maintained in accordance with each cooperative buying group 1010. Thus, as is shown in FIG. 3, procurement module 1014 for each cooperative buying group 1010 may be consolidated into a single or multiple procurement systems 1060. Similarly, each end user 1000 includes a procurement system 1003, allowing for procurement of materials from each cooperative buying group procurement module 1014, via procurement system 1060. The procurement system for each such end user may preferably combine procurement options for all cooperative buying groups to which the end user belongs, or may comprise a separate procurement system for each.

It is further contemplated in accordance with an embodiment that the various procurement options may be presented to each end user 1000 via one or more procurement websites made available to each individual end user 1000 for each cooperative 1010, or in a consolidated manner. This procurement information, as noted above, may be determined from not only previously presented historical data to determine future needs, but may also include present orders provided to predictive engine 1020 from procurement system 1060, forwarded to manufacturers or sources of goods and services 1040 and 3$^{rd}$ party logistics providers (and fulfillment) 1030, and ultimately updated and returned to the procurement module via optimization engine 1050. Through the procurement system associated with each cooperative buying group, each individual end user is able to make determinations about when to purchase product, how much product to purchase, and how and when it will delivered to each end user.

Each such website may be provided as an industry-specific (and/or multi-industry) website to each end user entity 1000, with various functionality related to order execution, pricing, logistics (time and delivery, cost for 3$^{rd}$ party logistics, as applicable), accounts payable, order history, pricing history and peer to peer communications, as well as communications from any end user 1000 to other entities, such as managers of one or more cooperative buying groups 1010, manufacturers or original source of goods and services 1040, 3$^{rd}$ party logistics providers 1030, customer support (CRM, client relations management) and the like. Further communications platforms may be provided between manufactures or original sources of goods and services 1040 and end users 1000 where new information on products is available, thus allowing for a most up to date searching on product specifications, and other product information, and services. Such a platform and channel may also allow for one or more important announcements to be made unobtrusively, and made available to any end user who wishes to view the information. An order screen may be provided so that end users may have detailed information to order items that are specific to their industry, and in particular the approximately 20% of product, (or stock keeping unit (sku#s), each indicative of a different good or service including particular specifications) that typically makes up approximately 80% of their spend on purchases (for industry-specific cooperative buying groups), of for the approximately 80% of product (or sku#s) that typically makes up approximately 20% of their spend on purchases (for cross/multi-industry cooperative buying groups). Products being provided in each such scenario may be determined in accordance with one or more of volume per order, frequency of orders, total annual ranking of spend per product, and the like. The sku#s and other product information may be provided to one or more of the procurement websites including information on price, minimum order quantities, 3$^{rd}$ party logistics costs (where applicable), etc.

The use of such a website or intranet will thus allow for the accumulation of orders and other information transfer from each individual end user 1000, via optimization engine 1050 and procurement system 1060, to the corresponding cooperative buying group 1010. Furthermore, order quantities from different cooperatives may be combined to meet minimum order quantities as appropriate, or to otherwise further reduce costs. Once properly accumulated, procurement system 1060 preferably will order the goods from the manufacturers, and set delivery schedules taking production and shipping timetables, etc. as will be described below. In such a manner, individual end users are presented with an easy to use, cost effective and transparent product and service ordering system.

A minimum order quantity may be related to an order amount necessary for a particular product to fill a delivery unit in a particular geographic area, so that as noted above, direct delivery may be available. Such direct delivery may result in reduced cost for the end user ordering the substantial quantity of goods as direct delivery from the manufacturer or original source of goods 1040 to the end user 1000, as will be described below. Procurement system 1060, in accordance with optimization engine 1050 may provide information to an end user 1000 regarding opportune times to order and/or have goods delivered. For example, if a large quantity of a particular good is to be delivered to a particular geographic region on a day next week, attempts to order delivery of such a good this week may result in notification of a price reduction that may be available by waiting for delivery of goods until the next week. End user 1000 may then select to wait for the less expensive shipment, or opt to order the more expensive, but earlier delivered goods if time is important. Such advice may also be provided to one or more end users 1000 when optimization engine suggests ordering a particular good at a particular time to fill a production run or delivery unit when combined with expected order sizes from other end users in the same cooperative.

If the end user wishes to order a smaller amount than the direct delivery minimum order quantity, and cannot take advantage of any combined ordering, price adjustments are preferably made to account for needed $3^{rd}$ party logistics provider 1030. If at a later time, other cooperative end users request similar products eventually resulting in the minimum order quantity being reached, associated pricing savings based upon the delivery of the minimum order quantity to the geographic location may be provided. Such advice provided to one or more end users 1000 may be based upon a combination of actual orders presented via procurement system 1060 and input from predictive engine 1020 related to past behavior and further likely orders of goods and services, this information being updated with current info from the procurement system and optimization engine for individual enterprises and various cooperative buying groups.

In accordance with further embodiments of the invention, as an end user 1000 enters information into the system to select and order goods or services, the procurement system, employing the optimization engine, may review these order amounts to determine whether these orders are outside a normal range of ordered product for that particular end user, and may notify the user of any such unexpected order quantity to guard against ordering errors. If these orders are correct, this change in order quantity will flow through the system, via procurement system 1060, eventually notifying the supplier and shipping entities of this increase or decrease in demand (consumption change) via the update of the predictive engine 1020.

As a particular end user orders goods and services, accumulated costs will be provided to the end user in a transparent manner, including cost per purchase, cost per particular item or sku#, $3^{rd}$ party logistics costs, any cost for administration of the cooperative buying group, etc. If at any time, the above noted bulk shipping option is met or other cost savings may be realized through aggregation of other individual enterprises 1000 wanting the same products and services at relatively the same time, and therefore costs can be reduced, either because the single end user can receive a single end shipping amount, or because other end users have ordered similar goods to allow for a single shipment to be delivered to a particular geographic location, thus avoiding any charges for third party logistics or reducing them per delivery point by aggregate for the day, such cost savings may be passed on to the individual end users 1000. Any such orders will also include end user delivery dates. To the extent that orders may be combined, but still be maintained within a previously promised price and delivery date, these orders may be combined. As noted above, if such combination would push out a delivery date, the end user may be given a choice of whether to receive the goods at the previously provided earlier delivery date, but likely a higher cost, or at the later delivery date, made lower by $3^{rd}$ party logistics efficiency by the behavior of other end users in the cooperative buying groups into which the particular end user 1000 is included. Alternatively, the system may be set to not allow for the extension of a delivery date ever, or if the user indicates that delivery timing is critical.

If changes by a manufacturer/original source in price, specifications or the like are encountered, or if any changes in the cost or other scheduling issues of $3^{rd}$ party logistics providers is necessary or provided by the logistics providers, such information will be immediately conveyed to the end user, allowing for confirmation of the new information for an order. The end user may receive delivery, or may cancel, or change the order at this time. Such information is also transmitted to the optimization engine in near real time, thus allowing for this new pricing information to be shared with all end users 1000 when purchasing goods and services.

Referring once again back to FIG. 1, after ordering of goods and services by end user 1000 through procurement module 1003 via procurement system 1060, which incorporates one or more procurement modules 1014 of one or more cooperative buying groups 1010, accumulated and individual purchase order information may be provided to manufacturer or original source of goods and services 1040 and third party logistics providers 1030 (where necessary) in order to schedule production and delivery of the ordered goods and services. Such information is provided from procurement module 1003 of end user 1000 (as shown in FIG. 2) to procurement module 1014 of cooperative buying group 1010 (as shown in FIG. 3) to sales module 1048 of manufacturer or original source of goods 1040 to properly place the order, and also to sales module 1038, advanced shipping notice module 1032 and demand flow scheduling system 1033 of $3^{rd}$ party logistics provider 1030 (when $3^{rd}$ party logistics is to be employed) in order to reserve $3^{rd}$ party logistics services. After such ordering is placed, accounting information from accounting module 1047 is provided to accounting module 1013 of cooperative buying group 1010, where it is in turn split and provided to accounting module 1002 of each end user 1000. A similar path is provided for accounting information from $3^{rd}$ party logistics provider 1030, the accounting information being provided from module 1037 to the cooperative buying group accounting module 1013, and in turn the end user accounting module 1002.

Alternatively, depending on who is to bear shipping and other $3^{rd}$ party logistics charges, such accounting information may be provided from $3^{rd}$ party logistics provider 1030 (and associated accounting module 1037) to manufacturer or original source of goods and services 1040 (and associated accounting module 1047). This accounting information may then be included with the accounting information being sent from manufacturer or original source of goods and services 1040 to cooperatives buying groups 1010 (and associated accounting modules 1013) and then to end user 1000 (and associated accounting modules 1002), as described above.

Finally, the ordered goods may be shipped to the end users 1000. It is contemplated in accordance with one or more embodiments of the invention that shipping of products to end users may preferably follow one of two paths. If particular end users are to receive greater than a certain amount of a particular product so that a single shipping unit, such as a truck, can visit a small number of end users with a full shipping unit (for example, if a particular user has ordered more than ⅙ of a truckload, typically four palettes or more of goods), then such a shipping unit may be provided directly from a particular manufacturer or original source of goods and services 1040 to each end users 1000. If, on the other hand, a particular end user is to receive a smaller product shipment, in addition to providing shipping services, one or more $3^{rd}$ party logistics providers 1030 may receive a shipping unit from one or more manufacturers or original sources of goods and services 1040, break up the shipment, and ship to each end user separately in small batches, possibly consolidated (through one or more fulfillment processes) with any other sku#s that have been ordered by the particular end user 1000. Thus, if a particular end user is to receive a large amount of total product made up of small amounts of different products, these different products may be loaded to a single shipping unit, and then delivered in a bulk fashion to the particular end user 1000 from the $3^{rd}$ party logistics provider 1030. Use of such a repackaging of shipping units may follow a similar rule to the direct shipping system described above. In this manner, a most efficient system for shipping products to end users is employed, direct shipping when efficient, grouping and intermediate handling of products when appropriate, through intermediate fulfillment providers, such as $3^{rd}$ party logistics providers. Finally, a portion of a truckload or other shipping unit may be delivered directly to an end user 1000 from a manufacturer or original source of goods and services 1040, while the remaining portion of the shipping unit may be forwarded to $3^{rd}$ party logistics provider 1030.

Consolidation of all ERP information into a single, unified system allows for organized and ultimate efficiency of manufacturing based upon true consumer needs and consumption behavior, managed and efficient shipping and delivery of products to end users, consolidated order fulfillment and billing from manufacturers to end users, and efficient use and management of third party logistics systems when appropriate. It is only through this inventive consolidated approach that multiple levels of distribution may be removed from supply and procurement schemes, providing a best price to an end user, while allowing producers to have unparalleled view into customer needs and behavior, thus allowing for production and supply of needed quantities of products and services. Details of information provided by each entity in FIG. 1, and the interrelationship therebetween will now be described.

Cooperatives buying groups 1010 will therefore represent new buying entities owned by the end users 1000 associated therewith (or by another entity), for each of the individual independent end users 1000, enabling these end users to disintermediate themselves from the traditional supply chain. This new cooperative buying group 1010 constitutes a new entity adapted to aggregate volume of purchases to buy direct from manufacturer or original sources of goods and services 1040. Through these cooperatives, individual end users will reap the benefits of essentially dealing directly with manufacturers and original sources of goods and services. It is anticipated that the cooperative buying groups may take actual title to procured goods, making final payment on behalf of the individual end users 1000, and may then bill and interface with each individual end user. Differences in timing for changes in title may be provided to accommodate any customary goods transfer. Of course, other scenarios, including provision of services to an end user, where the cooperative buying group 1040 does not take ownership of the products or services, and rather acts only as a planning intermediary may also be employed. An overall accounting management system may be provided, tracking accounts payable from individual enterprises to the cooperatives and the cooperatives to the manufacturers and original sources of goods and services, thus not only allowing for efficient and managed ordering and fulfillment, but also billing and all other aspects associated with procurement of goods and services.

Past demand (consumption behavior) and/or current behavior information may be provided to predictive engine 1020 in accordance with past and/or current product and service needs by individual end users 1000 and/or cooperative buying groups 1010. Of course, expected weather changes, demand changes, usage changes, behavioral changes, consumption changes, or any other factors that might affect the amount of product or services necessary (such as, in the case of a University, expansion of campus to allow additions to student body and faculty, addition of a new concentration of education, etc.), or any other significant changes in operation may be accounted for, and thus adjust demand predicted by the predictive engine. Thus, nearly all aspects related to product manufacturing, service rendering, and supply may be determined not only based upon historical guesses, but rather on particular past consumption, current consumption and future demand information provided by individual end users 1000 and their behavior.

Similarly, once amounts of products and services are determined by end users 1000 and ordered by cooperative buying groups 1010, such ordering information may be provided to manufacturers or original sources of goods and services 1040 and $3^{rd}$ party logistics providers 1030 (where needed), and in particular, information may be provided directly into their ERP system. In this manner, $3^{rd}$ party logistics fulfillment providers' entities are aware of upcoming shipment and fulfillment needs even before notification by the manufacturers, and can then best plan their needs moving forward. As noted above, shipping information from the manufacturers or original sources of goods and services 1040 for goods that may require additional $3^{rd}$ party logistics treatment may be provided directly to $3^{rd}$ party logistics providers 1030 into their supply chain management system 1036, as this information may not be available until actual shipping quantities and dates are provided, and it is determined that direct shipping of goods will not take place, but rather that additional logistics and fulfillment activities may be necessary. As further noted above, large enough shipments may be provided directly to one or a small number of end users, thus perhaps eliminating the use of the $3^{rd}$ party logistics providers 1030, and costs associated therewith, in some cases.

Cooperative buying groups 1010 may further receive accounting information from each of manufacturers or original sources of goods and services 1040 and $3^{rd}$ party logistics providers 1030, and may process and provide individual accounting information to each end user 1000. Thus, cooperative buying groups 1010 mediate availability of product from manufacturers or original sources of goods and services 1040, ordering from end users 1000, delivery of products or services, directly to end users 1000, or through the intermediate use of $3^{rd}$ party logistics providers 1030, and facilitate easy and proper billing of the end users 1000.

Thus, in accordance with the various embodiments of the invention, rather than each individual end user 1000 interfacing with multiple levels of distribution for each product, a cohesive system may be provided, allowing for end-user owned cooperatives to procure products in an efficient managed and cohesive manner. It is further contemplated in accordance with an embodiment of the invention that an expert service provider may maintain the underlying platform and channel, and by way of example, support the collection of purchasing and usage information from end users 1000, maintaining predictive engine 1020, providing information to manufacturers and/or original sources of goods and services 1040 and $3^{rd}$ party logistics providers 1030, maintaining optimization engine 1050, and may be maintaining accounting 1014 at the cooperative level and may even be maintaining accounting at the individual end user 1003, procurement system 1060. As part of service provided by the expert service provider, direct negotiation with manufacturers or original sources of goods and services 1040 and $3^{rd}$ party logistics providers 1030 will or may be performed on behalf of each cooperative buying group 1010 and individual enterprises 1000. This expert service provider may earn a fee for its services, but it is anticipated in accordance with the invention that the reductions in costs for supply and delivery of goods and services will be substantially greater than such fee. Expertise of the expert service provider, this invention of the channel and platform (single ERP system), coupled with the formation of new purchasing entities (cooperative buying groups 1010) will allow for a new supply chain to be employed, disintermediating much of the currently existing supply chain, and therefore shifting manufacturers or other sources of goods and services, as well as $3^{rd}$ party logistics and fulfillment providers from "made to stock" entities to "made to order" and/or "just in time" entities, and further allowing for 3$^{rd}$ party logistics providers to become much more efficient in performance of their services.

As will now be shown with particular examples, use of the inventive system results in a more efficient overall supply chain, and as a result substantial savings for end users, a reduction in environmental impact of delivery and carbon footprint, and less wasted produced product, thus aiding in avoiding over or under supply of product, in turn reducing substantial unplanned price swings and production shortages. The efficient planning by manufacturers or original sources of goods and services and 3$^{rd}$ party logistics providers may remove substantial costs from the production and delivery scheme. Efficiencies may be further realized in the ability to more efficiently hedge energy costs, properly employ necessary manpower, purchase raw materials or other unfinished goods more efficiently, more efficiently deploy capital, reduce accounts receivable cycle, thus reducing working capital requirements, reducing inventory and inventory support costs while also reducing future inventory write downs and other obsolescence of inventory, by way of example.

Figure 6:
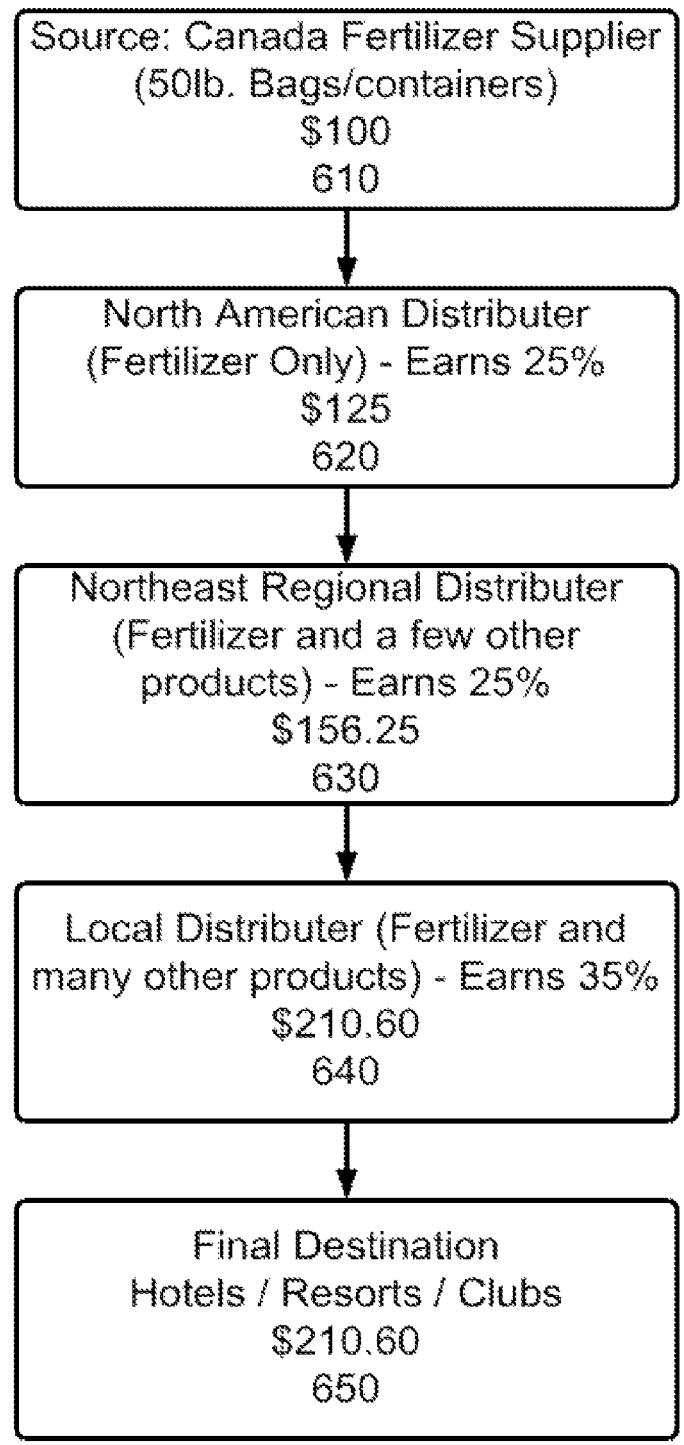
FIG. 6 is a flowchart diagram depicting an example of a current supply chain.

As is next shown in FIG. 6, a current supply chain solution is shown for the exemplary fertilizer industry. As is shown, a source of fertilizer 610, such as a Canadian manufacturer or original source of fertilizer, may charge a price of $100 for a 50 pound bag, or other appropriate amount of fertilizer. This supplier has no idea of how much fertilizer may be required in the market, only receiving information based upon its supply chain interaction only with next lower level purchaser or inventory movement with the next levels of supply chain, and so production amount is a guess, and must be provided in order to support inventory carried at each level of the supply chain, each of which is also a guess. This fertilizer is then typically passed or sold to a North American Distributor of Fertilizer 610, who similarly has no idea of how much fertilizer will actually be needed this year or next by the ultimate end user's current and next year's consumption. Therefore this distributor must charge a premium to account for fertilizer it will buy that may not be purchased buy the next level of distribution, and to cover inventory costs, etc. for a presently unknown period of time. This NA distributor typically applies a markup of between 20 and 25% of the cost of the fertilizer to it, so at this point, the price of the fertilizer has risen to $125. Next, this fertilizer is passed or sold to a regional Northeast distributor 620 (for example) that distributes fertilizer and other related products. Again, this distributor has no insight into fertilizer needs (by the end user at this point in time), and therefore must again charge a premium to account for fertilizer it will buy that may not be sold in the market, and that it must inventory for an unknown period of time. This second distributor may similarly apply a markup of 25% on products it handles, thus raising the price of the fertilizer to $156.25. Elimination of the multiple levels of distribution further reduces redundant; inventory costs, occupancy costs, sales costs, costs of amortization of facilities, handling and shipping, etc.

This fertilizer will similarly be passed or sold to a local distributor 630 who may have relationships with the final purchasers of this and any number of other items. These final purchasers are typically organizations in the hospitality industry, education, healthcare, and the like, but of course may be any enterprise, government entity, etc. based upon the particular good. Retail stores or any other purchasers may similarly comprise these final purchasers. While this distributor may have some insight into customer needs based upon direct interaction therewith, these would be based upon anecdotal historical properties, and cannot account for changes in demand, such as if the weather were particularly harsh over the winter, if the price of goods become prohibitive, if a customer has added area that needs to be fertilized, etc. The local distributor may add as much as a further 35% to their cost of the fertilizer, resulting in a cost to the final purchaser of $210.60, more than double the initial payment to the fertilizer manufacturer or original source of the goods. The inventors of the present invention suggest that inefficiencies in both the number of levels of distribution and their redundant costs that add no value, in addition to the lack of knowledge about upcoming demand (redundant inventory costs), contribute to these higher prices and inefficient distribution of product. These inefficiencies result in multiple occupancy of various levels of the supply chain, requiring costly sales and marketing organizations, SG&A costs, operational inefficiencies, excess capital costs, inefficient energy utilization, more extensive carbon footprints, various handling costs, and the like, each of which adds no value to the products or supply chain, and in fact results in no change to the finished product. It is therefore a benefit if the present invention to remove all inefficient costs that do not add value to the process or result in a change to the final product. In this manner, only necessary costs related to the provision of the end product, and efficient delivery of that product to end users are incurred.

Figure 7:
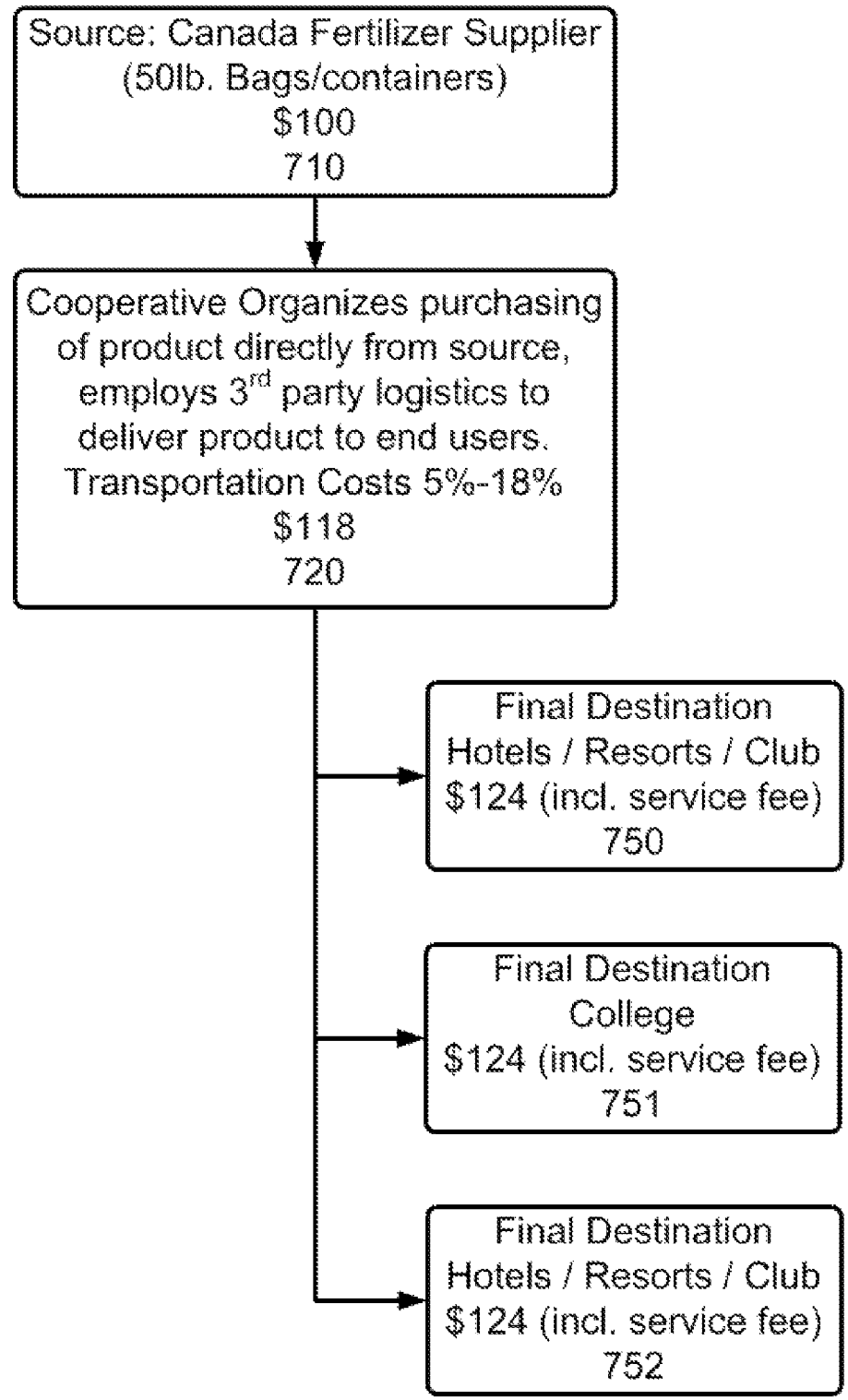
FIG. 7 is a flowchart diagram depicting an example of an alternative supply chain that may be implemented in accordance with one or more embodiments of the invention.

Referring next to FIG. 7, a new and more efficient supply chain 700, employing the features of the invention described above (a new channel and platform), may be achieved in accordance with embodiments of the present invention. As is shown in FIG. 7, Fertilizer supplier 710 still receives the same $100 for their fertilizer. However, instead of employing various levels of distribution, an inventive disintermediation entity 720 (such as a group managing multiple cooperatives 1010) employs the combined ERP system described above to remove the need for these intermediate levels of distribution and storage, and accompanying costs associated with distribution, storage, inventory, etc. as noted above and is able to purchase precisely the correct and needed amount of the product for use by the final customers, thus providing substantial efficiencies in the process, while allowing the manufacturer or original source of goods to become made to order rather than made to stock. Because of the unique insight into customer needs, there is virtually no wasted product produced or purchased, redundant non value added costs are eliminated, and the various made to order benefits, etc. are realized in the matter as noted above. Because of the flat organization and lack of multiple levels of distribution, common carriers can be used to distribute product to end consumers directly from the fertilizer supplier. As noted above, it is anticipated that for larger orders (such as less than six final customers able to buy an entire truck load or other distribution unit, for example), the distribution system will transport product directly to these final customers from the manufacturer or original source. In a situation where smaller orders are needed, this material may be provided to a single distribution center, where different products (such as fertilizer, chemicals, maintenance supplies, construction materials, etc.) may be combined and efficiently shipped in bulk to each individual final customer. Or, these smaller lots may be individually transmitted to the final customer employing one or more independent shipping companies, or 3$^{rd}$ party logistics providers able to break bulk product deliveries and make individual or consolidated deliveries (in the case of multiple products being delivered to a single end user). This scheme for direct shipping, or the use of a single level of 3$^{rd}$ party logistics removes redundant, non-value added costs of inventory, SG&A, occupancy costs, A/R, A/P costs, etc.

Shipping of such goods may cost approximately 18% of the initial supply cost of the product from the manufacturer or original sources of goods and services, raising the cost of goods to only $118. Furthermore, because of the precision ordering available and the lack of waste, the organizing company organizing these cooperatives 1010, and managing distribution, etc. can easily function adding only 5% to the cost of goods, for a final cost to the final customers of only $124, by way of example. Thus, the final customer receives goods at a substantial discount, in an easier to manage process. Less product is wasted, quantities are well known ahead of time, and transportation is far more efficient.

Referring once again back to FIG. 1, a computer system, individually maintained, positioned in a cloud computing scenario, or otherwise provided is preferably adopted to support all functions of the invention. Thus, such a computer system preferably includes input systems, comprising direct data input, or input through the user of APIs or other methods for automatic data input. Such data may be input to the system from any of the entities, such as manufacturers/original sources, $3^{rd}$ party logistics and fulfillment entities and cooperatives, as noted above. Furthermore, each cooperative buying group member or consolidated group may be provided with a website or other online system allowing for individual end users 1000 to enter any type of demand or other information. Linking of ERP or other data systems from the individual end users may allow for automated information transmission. It is anticipated that such a computer system will comprise one or more processor, storage devices, user access points and data information input and output systems. Any known local or remote computing system may be provided, and may further include backup systems, redundant data storage and processing systems and the like.

Therefore, in accordance with one or more embodiments of the present invention, as described above, an improved method and system are provided for procuring goods and services for a plurality of end users.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

What is claimed:

1. A non-transitory computer readable storage medium having a computer program stored thereon, the computer program causing a general purpose computer to perform a method for providing a supply chain as a service, comprising the steps of:
    accumulating information relating to past, present and future product demand and consumption for each of a plurality of end users and final purchasers having similar product or service requirements by a cooperative buying group representing a single purchase in bulk to disintermediate the supply chain;
    accumulating the received product demand into a single predictive demand schedule by the cooperative buying group;
    transmitting the accumulated predictive product demand schedule to a manufacturer/original source of the product by the cooperative buying group;
    receiving product availability information based upon the accumulated predictive product demand from the manufacturer/original source of the product by the cooperative buying group;
    providing the product availability information to the plurality of end users and final purchasers by the cooperative buying group in accordance with a website based display of such product availability information;
    receiving one or more product orders from one or more of the plurality of end users and final purchasers by the cooperative buying group by the website based display of the product availability information;
    ordering product from the manufacturer/original source of the product and managing all aspects of the supply chain in accordance with the received one or more product orders by the cooperative buying group; and
    shipping the product from the manufacturer/original source of the product to one or more of the plurality of end users and final purchasers in accordance with the received product order information from the cooperative buying group for each of the end users and final purchasers.

2. The method of claim 1, wherein the product is shipped directly from the manufacturer/original source of the product to a particular end user and final purchaser if the cooperative buying group identifies one particular end user and final purchaser who demands more than a predetermined amount of product.

3. The method of claim 1, wherein the product is a service.

4. The method of claim 1, further comprising the steps of:
    transmitting the accumulated product demand by the cooperative buying group to one or more logistics and fulfillment providers;
    receiving logistics information by the cooperative buying group from the one or more logistics and fulfillment providers;
    providing the product availability information together with the logistics information to the plurality of end users and final purchasers by the cooperative buying group in accordance with the website based display of the product availability information;
    receiving one or more product orders from one or more of the plurality of end users and final purchasers by the cooperative buying group by the website based display of the product availability information;
    ordering logistics services by the cooperative buying group from the logistics and fulfillment provider in accordance with the received one or more product orders by the cooperative buying group for one or more of the plurality of end users and final purchasers if it is determined that a product order for the one or more of the plurality of end users and final purchasers is less than a predetermined amount;
    shipping the product from the manufacturer/original source of the product to the one or more of the plurality of end users and final purchasers via the logistics providers in accordance with the received product order information from the cooperative buying group for each of the one or more of the plurality of end users and final purchasers.

5. The method of claim 4, wherein the step of accumulating the received product demand into a single demand schedule by a cooperative buying group and transmitting the accumulated product demand to the manufacturer/original source of the product and to the logistics and fulfillment providers are performed in accordance with the operation of a predictive engine.

6. The method of claim 5, wherein the predictive engine predicts future demand for products and logistics services.

7. The method of claim 4, wherein the step of providing the product availability information together with the logistics information to the plurality of end users and final purchasers by the cooperative buying group is performed in accordance with the operation of an optimization engine.

8. The method of claim 7, further comprising the steps of: receiving by the cooperative buying group one or more end user requirements related to delivery of the product; and providing by the cooperative buying group a most cost efficient method of logistics in accordance with the received requirements.

9. The method of claim 8, wherein the one or more end user requirements is selected from the group of cost, quality and time.

10. The method of claim 1, further comprising the steps of: receiving by the cooperative buying group one or more end user requirements related to the product; and providing by the cooperative buying group a most cost efficient method of procuring the product from the manufacturer/original source of the product in accordance with the received requirements.

11. The method of claim 10, wherein the one or more end user requirements is selected from the group of cost, time, and product characteristics.

12. The method of claim 11, wherein the optimization engine suggests a change in one or more of the end user requirements in order to improve one or more of the other end user requirements.

13. The method of claim 1, wherein the cooperative buying group is owned by each of the one or more of the plurality of end users and final purchasers.

14. The method of claim 13, wherein the plurality of end users and final purchasers are from one or more similar industries having one or more similar demand requirements.

15. The method of claim 1, wherein the plurality of end users and final purchasers having similar product or service requirements are aggregated.

16. The method of claim 1, wherein the step of ordering product from the manufacturer/original source of the product is performed by an expert procurement partner in order to provide the supply chain as a service, and disintermediate that supply chain.

17. A computer program stored to a non-transitory computer storage medium, the computer program causing a general purpose computer to perform the steps of providing a supply chain as a service, comprising:
receiving information relating to past, present and future product demand and consumption for each of a plurality of end users and final purchasers in a predefined industry by an expert service provider on behalf of a cooperative buying group;
accumulating the received product demand into a single predictive demand schedule by the expert service provider on behalf of the cooperative buying group in order to disintermediate the supply chain and provide the supply chain as a service;
transmitting the accumulated predictive product demand schedule to a manufacturer/original source of the product by the expert service provider on behalf of the cooperative buying group;
receiving product availability information based upon the accumulated predictive product demand from the manufacturer/original source of the product by the expert service provider on behalf of the cooperative buying group;
providing the product availability information to the plurality of end users and final purchasers by the expert service provider to the members of the cooperative buying group;
receiving one or more product orders from one or more of the plurality of end users and final purchasers by the expert service provider on behalf of the cooperative buying group;
ordering product from the manufacturer/original source of the product in accordance with the received one or more product orders by the expert service provider on behalf of the cooperative buying group; and
shipping the product from the manufacturer/original source of the product to one or more of the plurality of end users and final purchasers in accordance with the received product order information from the expert service provider for each of the end users and final purchasers of the cooperative buying group.

18. The computer program of claim 17, wherein the product is shipped directly from the manufacturer/original source of the product to one or more particular end users and final purchasers if the expert service provider identifies one or more end users and final purchasers who demand more than a predetermined amount of product.

19. The computer program of claim 17, wherein the product is a service.

20. The computer program of claim 17, wherein the computer program further causes the computer to perform the steps of:
transmitting the accumulated product demand to one or more logistics and fulfillment providers by the expert service provider;
receiving logistics information from the one or more logistics and fulfillment providers by the expert service provider;
providing the product availability information together with the logistics information by the expert service provider to the plurality of end users and final purchasers of the cooperative buying group in order to further disintermediate the supply chain;
receiving one or more product orders by the expert service provider from one or more of the plurality of end users and final purchasers of the cooperative buying group;
ordering logistics services by the expert service provider from the one or more logistics and fulfillment providers in accordance with the received one or more product orders from the one or more of the plurality of end users and final purchasers of the cooperative buying group for one or more of the plurality of end users and final purchasers if it is determined that a product order for the one or more of the plurality of end users and final purchasers is less than a predetermined amount;
shipping the product from the manufacturer/original source of the product to one or more of the plurality of end users and final purchasers via the one or more logistics providers in accordance with the received product order information for the expert service provider on behalf of each of the one or more of the plurality of end users and final purchasers of the cooperative buying group.

21. The computer program of claim 20, wherein the step of accumulating the received product demand into a single demand schedule by the expert service provider on behalf of the cooperative buying group and transmitting the accumulated product demand to the manufacturer/original source of the product and to the one or more logistics and fulfillment providers are performed in accordance with the operation of a predictive engine.

22. The computer program of claim 21, wherein the predictive engine predicts future demand for products and logistics services.

23. The computer program of claim 17, wherein the step of providing the product availability information together with the logistics information to the plurality of end users and final purchasers by the cooperative buying group is performed in accordance with the operation of an optimization engine.

24. The computer program of claim 23, wherein the computer program further causes the general purpose computer to perform the steps of:
receiving by the expert service provider one or more end user requirements related to delivery of the product; and
providing by the expert service provider a most cost efficient method of logistics in accordance with the received end user requirements in accordance with providing the supply chain as a service.

25. The computer program of claim 24, wherein the one or more end user requirements is selected from the group of cost, quality and time.

26. The computer program of claim 23, wherein the computer program further causes the general purpose computer to perform the steps of:
receiving by the expert service provider one or more end user requirements related to the product; and
providing by the expert service provider a most cost efficient method of procuring the product from the manufacturer/original source of the product in accordance with the received end user requirements.

27. The computer program of claim 26, wherein the one or more end user requirements is selected from the group of cost, time, and product characteristics.

28. The computer program of claim 27, wherein the optimization engine suggests a change in one or more of the end user requirements in order to improve one or more of the other end user requirements.

29. The computer program of claim 17, wherein the cooperative buying group is owned by each of the one or more of the plurality of end users and final purchasers.

30. The computer program of claim 29, wherein the plurality of end users and final purchasers are from one or more similar industries.

31. The computer program of claim 29, wherein the plurality of end users and final purchasers are from a plurality of dissimilar industries.

32. The computer program, of claim 29, wherein the plurality of end users and final purchasers have one or more similar demand requests.

33. A single enterprise resource planning (ERP) system incorporating information seamlessly, predicatively between individual end users and final purchasers, logistics and fulfillment providers and manufacturers or original sources of goods and services, comprising:
an input for receiving information by a computer system operated by an expert service provider on behalf of a collective buying group relating to product demand and consumption for each of a plurality of end users and final purchasers via a cooperative buying group;
a predictive engine implemented by a computer processor of the computer system operated by the expert service provider on behalf of the collective buying group for accumulating the received product demand into a single demand schedule;
an output for transmitting by the computer system on behalf of the expert service provider the single demand schedule to a manufacturer/original source of the product;
an optimization engine for receiving product availability information via the input of the computer system from the manufacturer/original source of the product by the cooperative buying group, and for determining one or more options for ordering the products by the computer processor of the computer system;
a procurement system implemented by the expert service provider on the computer processor of the computer system for providing the product availability information to the one or more options for ordering the products to the plurality of end users and final purchasers by the expert service provider on behalf of the cooperative buying group, for receiving one or more product orders from one or more of the plurality of end users and final purchasers by the expert service provider on behalf of the cooperative buying group, for ordering product from the manufacturer/original source of the product in accordance with the received one or more product orders by the expert service provider on behalf of the cooperative buying group, and for managing shipping the product from the manufacturer/original source of the product to one or more of the plurality of end users and final purchasers by the expert service provider in accordance with the received product order information for each of the end users.

34. The single ERP system of claim 33, wherein the output for transmitting the single demand schedule also transmits the single demand schedule to a one or more logistics and fulfillment providers for one or more of the plurality of end users and final purchasers by the expert service provider if it is determined that a product order for the one or more of the plurality of end users and final purchasers is less than a predetermined amount.

35. The single ERP system of claim 34, wherein the optimization engine further receives logistics information from the one or more logistics providers, provides the one or more options for ordering the product together with the logistics information to the one or more of the plurality of end users and final purchasers by the expert service provider on behalf of the cooperative buying group in order to further disintermediate the supply chain and provide the supply chain as a service; and
wherein the procurement system receives one or more product orders from one or more of the plurality of end users and final purchasers of the cooperative buying group, orders product from the manufacturer/original source of the product in accordance with the received one or more product orders, and manages the shipping of the product from the manufacturer/original source of the product to one or more of the plurality of end users and final purchasers via the one or more logistics providers in accordance with the received product order information for each of the one or more of the plurality of end users and final purchasers.

36. The single ERP system of claim 35, wherein the product comprises one of a product and a service.

37. The single ERP system of claim 35, wherein the procurement system generates the one or more orders in place of the one or more product orders from the one or more of the plurality of end users and final purchasers, resulting in automatic ordering therefore, thus creating a perpetual inventory system between the one or more plurality of individual end users and final purchasers and the one or more logistics providers and manufacturer/original source of the product and services.

38. A non-transitory computer readable storage medium having a computer program stored thereon, the computer program causing a general purpose computer to perform a method for providing a supply chain as a service, comprising the steps of:

aggregating specific demand for products and services from multiple individual entities and final purchasers in one or more similar industries by a cooperative buying group to reach one of a desired volume and frequency level;

transmitting the accumulated aggregated product and services demand by the cooperative buying group to a manufacturer/original source of the product and service;

receiving product and service availability information by the cooperative buying group based upon the accumulated predictive product and service demand from the manufacturer/original source of the product and service;

providing the product and service availability information to the plurality of individual entities and final purchasers by the cooperative buying group;

receiving one or more product and service orders from one or more of the plurality of individual entities and final purchasers by the cooperative buying group;

ordering product and services by the cooperative buying group from the manufacturer/original source of the product and services in accordance with the received one or more product and services orders by the cooperative buying group, thereby disintermediating the supply chain and allowing for procurement of product and services directly from manufacturers and original sources of products and services; and shipping the product and service directly from the manufacturer/original source of the product and service to one or more of the plurality of individual entities and final purchasers in accordance with the received product and service order information for each of the end users for each of the plurality of individual entities and final purchasers it is determined that the product and service order therefore are greater than a predetermined amount.

39. The method of claim 38, wherein demand is combined from individual enterprises entities and final purchasers with common demand requirements in multiple industries by a cooperative buying group to reach one of a desired volume and frequency level in order to disintermediate the supply chain.

40. The method of claim 38 wherein providing a supply chain as a service further comprises incorporating information to all pertinent components of business systems for manufacturers and original sources, including one or more of: manufacturing resource planning, human resources, raw material planning, energy utilization, sales, and capital resource planning.

41. The method of claim 39, wherein the product is a service.

42. The method of claim 39, further comprising the steps of:
transmitting the accumulated product and service demand to one or more logistics and fulfillment providers by the cooperative buying group for one or more of the plurality of individual entities and final purchasers if it is determined that a product order for the one or more of the plurality of individual entities and final purchasers is less than a predetermined amount;

receiving logistics information from the logistics and fulfillment provider by the cooperative buying group;

providing the product and service availability information together with the logistics information from the cooperative buying group to the plurality of individual entities and final purchasers;

receiving one or more product and service orders from one or more of the plurality of individual entities and final purchasers by the cooperative buying group;

ordering logistics services by the cooperative buying group from the one or more logistics and fulfillment providers in accordance with the received one or more product and service orders by the cooperative buying group for one or more of the plurality of individual entities and final purchasers if it is determined that a product order for the one or more of the plurality of individual entities and final purchasers is less than a predetermined amount;

shipping the product and service from the manufacturer/original source of the product and service to one or more of the plurality of individual entities and final purchasers via the one or more logistics providers in accordance with the received product and service order information for each of the one or more of the plurality of individual entities and final purchasers if it is determined that a product order for the one or more of the plurality of individual entities and final purchasers is less than a predetermined amount.

43. The method of claim 39, wherein the step of providing the product availability information together with the logistics information to the plurality of individual entities and final purchasers by the cooperative buying group is performed in accordance with the operation of an optimization engine.

44. The method of claim 43, further comprising the steps of:
receiving by the cooperative buying group one or more end user requirements related to delivery of the product; and
providing by the cooperative buying group a most cost efficient method of logistics in accordance with the received end user requirements.

45. The method of claim 44, wherein the one or more end user requirements is selected from the group of cost, quality and time.

46. The method of claim 43, further comprising the steps of:
receiving by the cooperative buying group one or more end user requirements related to the product; and
providing by the cooperative buying group a most cost efficient method of procuring the product from the manufacturer/original source of the product in accordance with the received end user requirements.

47. The method of claim 46, wherein the one or more end user requirements is selected from the group of cost, time, and product characteristics.

48. The method of claim 47, wherein the optimization engine suggests a change in one or more of the end user requirements in order to improve one or more of the other end user requirements.

49. The method of claim 39, wherein the cooperative buying group is owned by each of the one or more of the plurality of individual entities and final purchasers.

50. The method of claim 49, wherein the plurality of individual entities and final purchasers are from one or more similar industries having one or more similar demand requirements.

51. The method of claim 49, wherein the plurality of individual entities and final purchasers are from a plurality of dissimilar industries having one or more similar demand requirements.

52. The method of claim 39, wherein the step of ordering product from the manufacturer/original source of the product is performed by an expert service procurement partner providing the supply chain as a service.

53. A computer program stored to a non-transitory computer storage medium at a remote location, the computer program causing a general purpose computer to perform the steps of:

aggregating specific demand for products and services from multiple individual entities and final purchasers in one or more similar industries having one or more similar demand requirements by an expert service provider on behalf of a cooperative buying group to reach one of a desired volume and frequency level, the cooperative buying group comprising one or more individual entities and final purchasers grouped for the purpose of procuring products and services from a plurality of providers over an extended period of time as negotiated by the expert service provider;

transmitting the accumulated aggregated product and services demand to a manufacturer/original source of the product and service by expert service provider on behalf of the cooperative buying group;

receiving product and service availability information based upon the accumulated predictive product and service demand from the manufacturer/original source of the product and service by the expert service provider on behalf of the cooperative buying group;

providing the product and service availability information by the expert service provider on behalf of the cooperative buying group to the plurality of individual entities and final purchasers in accordance with the one or more similar demand requirements;

receiving one or more product and service orders from one or more of the plurality of individual entities and final purchasers by the expert service provider on behalf of the cooperative buying group;

ordering product and services from the manufacturer/original source of the product and services by the expert service provider in accordance with the received one or more product and services orders by the cooperative buying group, thereby disintermediating the supply chain and allowing for procurement of product and services directly from manufacturers and original sources of products and services; and shipping the product and service from the manufacturer/original source of the product and service to one or more of the plurality of individual entities and final purchasers as instructed by the expert service provider in accordance with the received product and service order information for each of the individual entities and final purchasers.

54. The computer program of claim 53, wherein demand is combined from individual entities and final purchasers in multiple industries by the cooperative buying group to reach one of a desired volume and frequency level in order to disintermediate the supply chain while providing the supply chain as a service.

55. The computer program of claim 54 wherein the product is shipped directly from the manufacturer/original source of the product to one or more individual entities and final purchasers if the expert service provider identifies one or more individual entities and final purchasers who demand more than a predetermined amount of product.

56. The computer program of claim 54, wherein the product is a service.

57. The computer program of claim 54, wherein the computer program further causes the general purpose computer to perform the steps of:

transmitting the accumulated product and service demand by the expert service provider to one or more logistics and fulfillment providers;

receiving logistics information from the one or more logistics and fulfillment providers by the expert service provider;

providing the product and service availability information together with the logistics information by the expert service provider via a website display to the plurality of individual entities and final purchasers of the cooperative buying group;

receiving one or more product and service orders by the expert service provider from one or more of the plurality of individual entities and final purchasers of the cooperative buying group;

ordering logistics services by the expert service provider from the one or more logistics and fulfillment providers in accordance with the received one or more product and service orders from the one or more of the plurality of individual entities and final purchasers of the cooperative buying group for one or more of the plurality of individual entities and final purchasers if it is determined that a product order for the one or more of the plurality of individual entities and final purchasers is less than a predetermined amount;

shipping the product and service from the manufacturer/original source of the product and service to one or more of the plurality of individual entities and final purchasers via the one or more logistics providers in accordance with the received product and service order information from the expert service provider on behalf of each of the one or more of the plurality of individual entities and final purchasers of the cooperative buying group.

58. The computer program of claim 57, wherein the step of providing the product availability information together with the logistics information to the plurality of individual entities and final purchasers by the cooperative buying group is performed in accordance with the operation of an optimization engine.

59. The computer program of claim 58, wherein the computer program further causes the general purpose computer to perform the steps of:

receiving by the expert service provider one or more end user requirements related to delivery of the product; and providing by the expert service provider a most cost efficient method of logistics in accordance with the received end user requirements.

60. The computer program of claim 59, wherein the one or more end user requirements is selected from the group of cost, quality and time.

61. The computer program of claim 60, wherein the computer program further causes the general purpose computer to perform the steps of:

receiving by the expert service provider one or more end user requirements related to the product; and providing by the expert service provider a most cost efficient method of procuring the product from the manufacturer/original source of the product in accordance with the received end user requirements.

62. The computer program of claim 61, wherein the one or more end user requirements is selected from the group of cost, time, and product characteristics.

63. The computer program of claim 62, wherein the optimization engine suggests a change in one or more of the end user requirements in order to improve one or more of the other end user requirements.

64. The computer program of claim 57, further comprising the step of automatically generating by the expert service provider the one or more orders in place of the one or more product orders from the one or more of the plurality of individual entities and final purchasers, resulting in automatic ordering therefore, thus creating a perpetual inventory system between the expert service provider on behalf of the one or more plurality of individual entities and final purchasers and the one or more logistics providers and manufacturer/original source of the product and services.

65. The computer program of claim 54, wherein the cooperative buying group is owned by each of the one or more of the plurality of individual entities and final purchasers.

66. The method of claim 65, wherein the plurality of individual entities and final purchasers are from one or more similar industries having one or more similar demand requirements.

67. The computer program of claim 65, wherein the plurality of individual entities and final purchasers are from a plurality of dissimilar industries having one or more similar demand requirements.

68. The computer program of claim 65, wherein the plurality of end users and final purchasers have one or more similar demand requests.

69. A single enterprise resource planning (ERP) system incorporating information seamlessly, predicatively between a plurality of end users, logistics and fulfillment providers and manufacturers or original sources of goods and services, thereby providing a supply chain as a service, comprising:
- an aggregator for aggregating specific demand for products and services from multiple end users in one or more similar industries by a computer system operated by an expert service provider on behalf of a cooperative buying group to reach one of a desired volume and frequency level, allowing for bulk purchases and disintermediation of the supply chain;
- an output for transmitting the accumulated aggregated product and services demand from the computer system on behalf of the expert service provider to a manufacturer/original source of the product and service;
- an optimization engine for receiving product availability information from the manufacturer/original source of the product by the computer system operated by the expert service provider, and for determining one or more options for ordering the products;
- a procurement system implemented by the computer system for providing the product availability information to the one or more options for ordering the products from the expert service provider to the plurality of end users of the cooperative buying group, for receiving one or more product orders from one or more of the plurality of end users of the cooperative buying group by the expert service provider, for ordering product from the manufacturer/original source of the product in accordance with the received one or more product orders by the expert service provider, and for managing shipping the product from the manufacturer/original source of the product to one or more of the plurality of end users in accordance with the received product order information for each of the end users from the expert service provider.

70. The single ERP system of claim 69, wherein the output for transmitting the single demand schedule also transmits the single demand schedule to one or more logistics and fulfillment providers.

71. The single ERP system of claim 70, wherein the optimization engine further receives logistics information from the logistics provider, provides the one or more options for ordering the product together with the logistics information to the plurality of end users from the expert service provider; and
- wherein the procurement system implemented by the computer system on behalf of the expert service provider receives one or more product orders from one or more of the plurality of end users of the cooperative buying group, orders product from the manufacturer/original source of the product in accordance with the received one or more product orders from the cooperative buying group by the expert service provider, and manages the shipping of the product from the manufacturer/original source of the product to one or more of the plurality of end users via the one or more logistics providers in accordance with the received product order information for each of the end users.

72. The single ERP system of claim 71, wherein the product comprises one of a product and a service.

73. The single ERP system of claim 71, wherein the procurement system generates the one or more orders in place of the one or more product orders from the one or more of the plurality of end users, resulting in automatic ordering therefore, thus creating a perpetual inventory system between the one or more plurality of individual end users and the logistics providers and manufacturer/original source of the product and services.

74. The single ERP system of claim 69, wherein demand is combined from individual entities with similar demand requirements in multiple industries having similar demand requirements by a cooperative buying group to reach one of a desired volume and frequency level in order to disintermediate the supply chain.

* * * * *